(12) United States Patent
Moon et al.

(10) Patent No.: US 11,183,747 B2
(45) Date of Patent: Nov. 23, 2021

(54) ELECTRONIC DEVICE INCLUDING ANTENNA MODULE

(71) Applicant: Samsung Electronics Co., Ltd, Suwon-si (KR)

(72) Inventors: Heecheul Moon, Suwon-si (KR); Sangyoup Seok, Suwon-si (KR); Kwonho Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/591,552

(22) Filed: Oct. 2, 2019

(65) Prior Publication Data

US 2020/0106167 A1 Apr. 2, 2020

(30) Foreign Application Priority Data

Oct. 2, 2018 (KR) ........................ 10-2018-0117623

(51) Int. Cl.
*H04M 1/02* (2006.01)
*H04B 1/40* (2015.01)
(Continued)

(52) U.S. Cl.
CPC .............. *H01Q 1/243* (2013.01); *H01Q 9/16* (2013.01); *H01Q 23/00* (2013.01); *H04M 1/026* (2013.01)

(58) Field of Classification Search
CPC ... H04B 1/08; H04B 1/03; H04B 1/40; H04B 1/04; H04B 1/16; H04M 1/03;
(Continued)

(56) References Cited

U.S. PATENT DOCUMENTS 6,128,515 A 10/2000 Kabler et al.
6,326,919 B1 12/2001 Diximus et al.
(Continued)

FOREIGN PATENT DOCUMENTS

CN 108376828 A 8/2018
EP 3703346 A1 9/2020
(Continued)

OTHER PUBLICATIONS

European Search Report dated Nov. 20, 2019 in connection with European Patent Application No. 19 20 0733, 14 pages.
(Continued)

*Primary Examiner* — Andrew Wendell

(57) ABSTRACT

An electronic device includes a housing that includes a front plate facing a first direction, a back plate facing a second direction opposite to the first direction, and a side member surrounding a space between the front plate and the back plate and at least a portion of which is formed of a metal material. A display is viewable through the front plate, and an antenna module is positioned in the space and includes a first surface facing a third direction different from the first direction and the second direction, a second surface facing a fourth direction different from the third direction, and at least one conductive element extended in a fifth direction, which is perpendicular to the third direction and the fourth direction and faces a first portion of the side member, adjacent to the side member, and between the first surface and the second surface.

20 Claims, 18 Drawing Sheets

(51) Int. Cl.
*H01Q 1/24* (2006.01)
*H01Q 9/16* (2006.01)
*H01Q 23/00* (2006.01)

(58) Field of Classification Search
CPC ........ H04M 1/02; H04M 1/026; H01Q 1/243; H01Q 9/16; H01Q 23/00; H01Q 21/062; H01Q 21/065; H01Q 21/29
See application file for complete search history.

(56) References Cited

U.S. PATENT DOCUMENTS

| | | | |
|---|---|---|---|
| 6,642,892 B2 | 11/2003 | Toshiyuki et al. | |
| 9,667,290 B2 | 5/2017 | Ouyang et al. | |
| 2004/0155821 A1 | 8/2004 | Ohara et al. | |
| 2006/0028386 A1* | 2/2006 | Ebling | H01Q 19/062 |
| | | | 343/754 |
| 2013/0147664 A1 | 6/2013 | Lin | |
| 2015/0070228 A1 | 3/2015 | Gu et al. | |
| 2015/0098174 A1 | 4/2015 | Song et al. | |
| 2015/0109172 A1 | 4/2015 | Iijima et al. | |
| 2016/0142083 A1* | 5/2016 | Kim | H01Q 9/145 |
| | | | 455/300 |
| 2016/0164178 A1* | 6/2016 | Komachi | H01Q 1/38 |
| | | | 343/702 |
| 2017/0012359 A1 | 1/2017 | Jung et al. | |
| 2017/0062899 A1 | 3/2017 | Takahashi et al. | |
| 2017/0250460 A1* | 8/2017 | Shin | H01Q 1/243 |
| 2017/0309582 A1* | 10/2017 | Meyer | H01L 24/20 |
| 2018/0026337 A1 | 1/2018 | Chen et al. | |
| 2018/0062263 A1* | 3/2018 | Ueda | H01Q 9/0407 |
| 2018/0241115 A1 | 8/2018 | Cho et al. | |
| 2019/0081394 A1* | 3/2019 | Edwards | H05K 5/0017 |
| 2019/0229405 A1 | 7/2019 | Xia et al. | |

FOREIGN PATENT DOCUMENTS

| | | |
|---|---|---|
| JP | 2006-319855 A | 11/2006 |
| JP | 2011-055279 A | 3/2011 |

OTHER PUBLICATIONS

International Search Report dated Jan. 29, 2020 in connection with International Patent Application No. PCT/KR2019/012754, 3 pages.
Communication pursuant to Article 94(3) EPC dated Dec. 23, 2020 in connection with European Patent Application No. 19 200 733.4, 15 pages.
Communication pursuant to Article 94(3) EPC dated Sep. 27, 2021 in connection with European Patent Application No. 19 200 733.4, 2 pages.

* cited by examiner

ELECTRONIC DEVICE INCLUDING ANTENNA MODULE

CROSS-REFERENCE TO RELATED APPLICATIONS

This application is based on and claims priority under 35 U.S.C. § 119 to Korean Patent Application No. 10-2018-0117623 filed on Oct. 2, 2018 in the Korean Intellectual Property Office, the disclosure of which is incorporated by reference herein its entirety.

BACKGROUND

1. Field

The disclosure relates to an electronic device including an antenna module.

2. Description of Related Art

Because an antenna operates at a relatively low frequency (e.g., 3 GHz or less), the antenna uses a metal material of a housing of an electronic device as a radiator. However, this manner fails to be applied to an antenna that operates at a high frequency (e.g., 6 GHz or more) having the strong straightness. The antenna that operates at a relatively high frequency may be mounted inside an electronic device as a separate module.

When radio waves are emitted, the antenna module may have an influence of a material of the housing forming the exterior of the electronic device. In particular, in recent mobile electronic devices, a portion of the housing is formed of a metal material.

The above information is presented as background information only to assist with an understanding of the disclosure. No determination has been made, and no assertion is made, as to whether any of the above might be applicable as prior art with regard to the disclosure.

SUMMARY

In the case of the electronic device including the housing of a metal material, a radio frequency (RF) signal that is radiated from an antenna module may have an influence of the metal material of the housing.

Aspects of the disclosure are to address at least the above-mentioned problems and/or disadvantages and to provide at least the advantages described below. Accordingly, an aspect of the disclosure is to provide an electronic device including an antenna module layout structure.

In accordance with an aspect of the disclosure, an electronic device may include a housing that includes a front plate facing a first direction, a back plate facing a second direction opposite to the first direction, and a side member surrounding a space between the front plate and the back plate and at least a portion of which is formed of a metal material, a display that is viewable through the front plate, and an antenna module that is positioned in the space and includes a first surface facing a third direction different from the first direction and the second direction, a second surface facing a fourth direction different from the third direction, and at least one conductive element extended in a fifth direction facing a first portion of the side member. The at least one conductive element may be adjacent to the side member and is between the first surface and the second surface, and the fifth direction may be perpendicular to the third direction and the fourth direction. The first surface may include a first periphery the closest from the first portion of the side member, and a second periphery the most distant from the first portion of the side member, and the first surface may make an angle between 1 degree to 15 degrees with the back plate such that the first periphery is closer to the back plate than the second periphery.

In accordance with another aspect of the disclosure, an electronic device may include a housing that includes a front plate facing a first direction, a back plate including a flat portion facing a second direction opposite to the first direction and a curved portion surrounding the flat portion, and a side member surrounding a space between the front plate and the back plate and at least a portion of which is formed of a metal material, a display that is viewable through the front plate, and an antenna module that is positioned in the space and includes a first surface facing a third direction different from the first direction and the second direction, a second surface facing a fourth direction different from the third direction, and at least one or more conductive elements extended in a fifth direction facing a first portion of the side member. The at least one conductive elements may be adjacent to the side member and is between the first surface and the second surface, and the fifth direction may be perpendicular to the third direction and the fourth direction. The first surface may include a first periphery the closest from the first portion of the side member and a second periphery the most distant from the first portion of the side member, and the first periphery may be disposed to be closer to the back plate than the second periphery.

In accordance with another aspect of the disclosure, an electronic device may include a housing structure that includes a first cover forming a first surface of the electronic device, a second cover forming a second surface of the electronic device, which is opposite to the first surface, and a side member surrounding a space between the first cover and the second cover and forming a third surface of the electronic device, a display that is interposed between the first cover and the second cover, and an antenna module that is interposed between the display and the second cover, and including a first surface including a first radiation region where a first RF signal is radiated, a second surface opposite to the first surface, a third surface formed between the first surface and the second surface and including a second radiation region where a second RF signal is radiated, and a fourth surface formed between the first surface and the second surface and opposite to the third surface. The antenna module may be disposed to be inclined at a given angle with respect to the second cover such that the first surface faces the second cover, the third surface is more adjacent to the side member than the fourth surface, and at least a portion of the second radiation region faces the second cover.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 13B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure will be described with reference to accompanying drawings. However, those of ordinary skill in the art will recognize that modification, equivalent, and/or alternative on various embodiments described herein can be variously made without departing from the scope and spirit of the disclosure.

Figure 1:
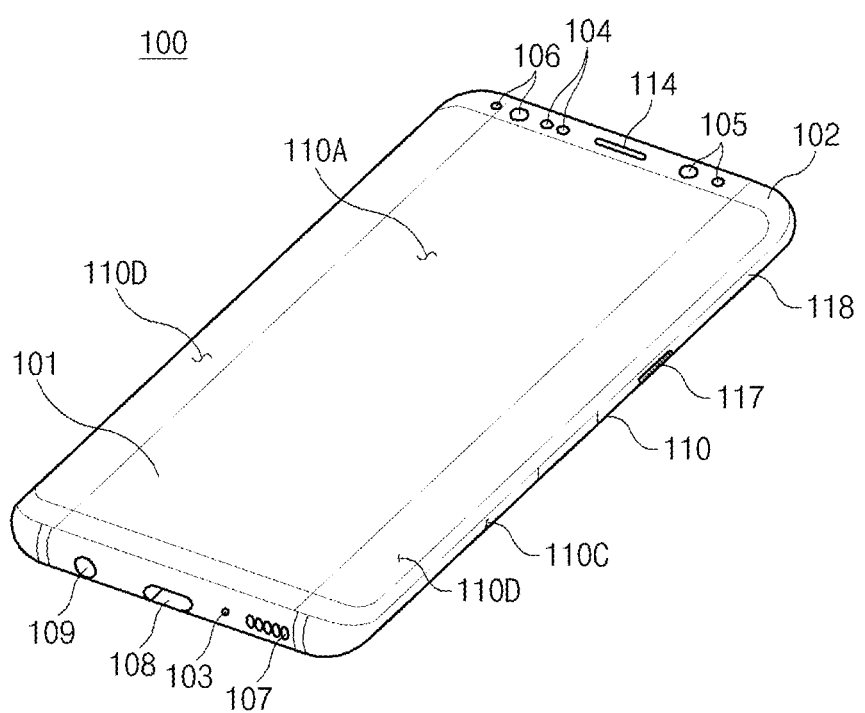
FIG. 1 illustrates a front perspective view of a mobile electronic device according to an embodiment.
Figure 2:
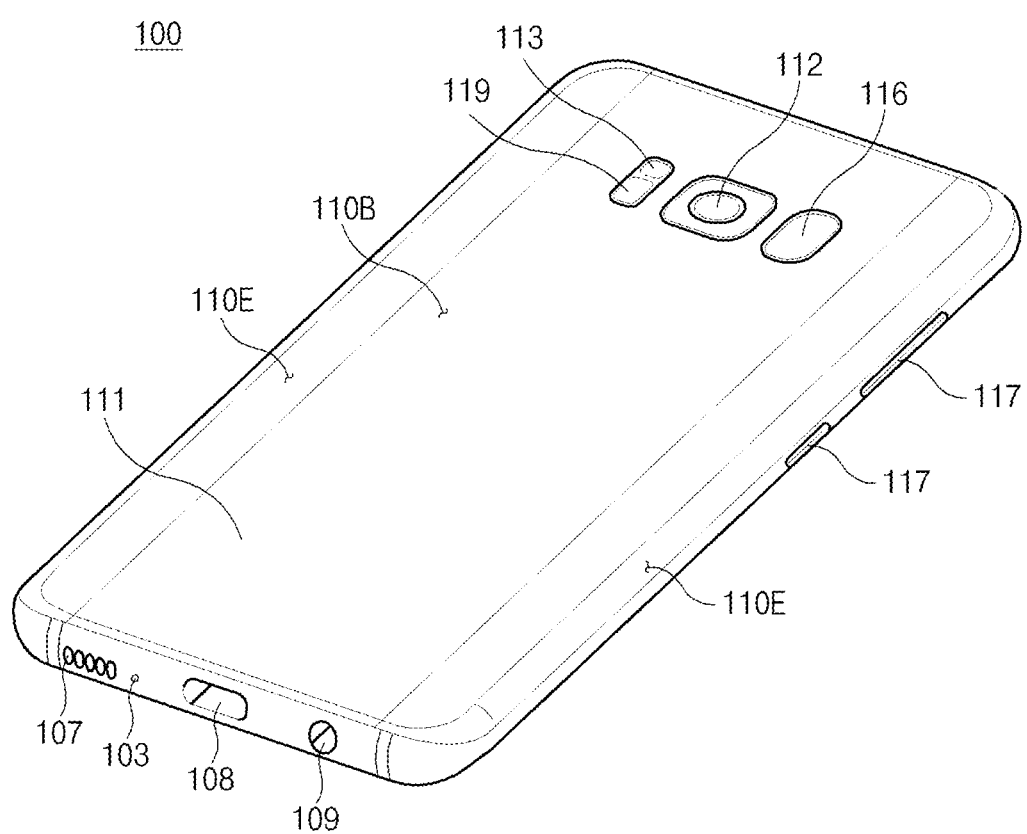
FIG. 2 illustrates a back perspective view of an electronic device of FIG. 1.

Referring to FIGS. 1 and 2, an electronic device 100 according to an embodiment may include a housing 110 including a first surface (or a front surface) 110A, a second surface (or a back surface) 110B, and a side surface 110C surrounding a space between the first surface 110A and the second surface 110B. In another embodiment (not illustrated), a housing may refer to a structure that forms a part of the first surface 110A, the second surface 110B, and the side surface 110C of FIG. 1. According to an embodiment, the first surface 110A may be implemented with a front plate 102 (e.g., a glass plate including various coating layers, or a polymer plate), at least a portion of which is substantially transparent. The second surface 110B may be implemented with a back plate 111 that is substantially opaque. For example, the back plate 111 may be implemented with a coated or colored glass, a ceramic, a polymer, a metal (e.g., aluminum, stainless steel (STS), or magnesium), or a combination of at least two of the materials. The side surface 110C may be coupled with the front plate 102 or the back plate 111 and may be implemented with a side bezel structure (or a "side member") 118 including a metal and/or a polymer. In an embodiment, the back plate 111 and the side bezel structure 118 may be integrally formed and may include the same material (e.g., a metal material such as aluminum).

In the embodiment illustrated, the front plate 102 may include two first regions 110D, which are bent toward the back plate 111 from the first surface 110A so as to be seamlessly extended, at opposite long edges of the front plate 102. In the embodiment (refer to FIG. 2) illustrated, the back plate 111 may include two second regions 110E, which are bent toward the front plate 102 from the second surface 110B so as to be seamlessly extended, at opposite long edges thereof. In an embodiment, the front plate 102 (or the back plate 111) may include only one of the first regions 110D (or the second regions 110E). In another embodiment, a part of the first regions 110D or the second regions 110E may not be included. In the embodiments, when viewed from a side surface of the electronic device 100, the side bezel structure 118 may have a first thickness (or width) on one side where the first regions 110D or the second regions 110E are not included, and may have a second thickness, which is smaller than the first thickness, on one side where the first regions 110D or the second regions 110E are included.

According to an embodiment, the electronic device 100 may include at least one or more of a display 101, an audio module (103, 107, 114), a sensor module (104, 116, 119), a camera module (105, 112, 113), key input devices 117, a light-emitting device 106, and a connector hole (108, 109). In an embodiment, the electronic device 100 may not include at least one (e.g., the key input devices 117 or the light-emitting device 106) of the components or may further include any other component.

The display 101 may be exposed through a considerable portion of the front plate 102, for example. In an embodiment, at least a portion of the display 101 may be exposed through the first surface 110A and the front plate 102 forming the first regions 110D of the side surface 110C. In an embodiment, a corner of the display 101 may be formed to be mostly identical to a shape of an outer portion of the front plate 102 adjacent thereto. In another embodiment (not illustrated), to increase the area where the display 101 is exposed, a distance between an outer portion of the display 101 and an outer portion of the front plate 102 may be formed mostly identically.

In another embodiment (not illustrated), a recess or an opening may be formed at a portion of a screen display region of the display 101, and at least one or more of the audio module 114, the sensor module 104, the camera module 105, and the light-emitting device 106 may be provided to be aligned with the recess or the opening. In another embodiment (not illustrated), a recess or at least one or more of the audio module 114, the sensor module 104, the camera module 105, the fingerprint sensor 116, and the light-emitting device 106 may be provided on a back surface of the screen display region of the display 101. In another embodiment (not illustrated), the display 101 may be coupled with a touch sensing circuit, a pressure sensor capable of measuring the intensity (or pressure) of a touch, and/or a digitizer capable of detecting a magnetic stylus pen or may be positioned adjacent thereto. In an embodiment, at least a part of the sensor module (104, 119) and/or at least a part of the key input devices 117 may be disposed in the first regions 110D and/or the second regions 110E.

The audio module (103, 107, 114) may include a microphone hole 103 and speaker holes 107 and 114. A microphone for obtaining an external sound may be positioned in the microphone hole 103; in an embodiment, a plurality of microphones may be positioned to make it possible to detect a direction of sound. The speaker holes 107 and 114 may include an external speaker hole 107 and a receiver hole 114 for call. In an embodiment, the speaker holes 107 and 114 and the microphone hole 103 may be implemented with one hole, or a speaker (e.g., a piezoelectric speaker) may be included without the speaker holes 107 and 114.

The sensor module (104, 116, 119) may generate an electrical signal or a data value corresponding to an internal operation state of the electronic device 100 or corresponding to an external environment state. The sensor module (104, 116, 119) may include, for example, the first sensor module 104 (e.g., a proximity sensor) and/or a second sensor module (not illustrated) (e.g., a fingerprint sensor) disposed on the first surface 110A of the housing 110, and/or the third sensor module 119 (e.g., a hear rate monitor (HRM) sensor) and/or the fourth sensor module 116 (e.g., a fingerprint sensor) disposed on the second surface 110B of the housing 110. The fingerprint sensor may be disposed on the second surface 110B as well as the first surface 110A (e.g., the display 101) of the housing 110. The electronic device 100 may further include a sensor module not illustrated, for example, at least one of a gesture sensor, a grip sensor, a barometric pressure sensor, a magnetic sensor, an acceleration sensor, a grip sensor, a color sensor, an infrared (IR) sensor, a biometric sensor, a temperature sensor, a humidity sensor, or the illumination sensor 104.

The camera module (105, 112, 113) may include the first camera device 105 disposed on the first surface 110A of the electronic device 100, and the second camera device 112 and/or the flash 113 disposed on the second surface 110B. The camera devices 105 and 112 may include one or more lenses, an image sensor, and/or an image signal processor. The flash 113 may include, for example, a light emitting diode or a xenon lamp. In an embodiment, two or more lenses (e.g., an infrared camera and wide-angle and telephoto lenses) and image sensors may be disposed on one surface of the electronic device 100.

The key input devices 117 may be disposed on the side surface 110C of the housing 110. In another embodiment, the electronic device 100 may not include all or a part of the key input devices 117, and the key input device not included may be implemented on the display 101 in the form of a soft key. In an embodiment, a key input device may include the sensor module 116 disposed on the second surface 110B of the housing 110.

The light-emitting device 106 may be disposed, for example, on the first surface 110A of the housing 110. The light-emitting device 106 may provide state information of the electronic device 100, for example, in the form of light. In another embodiment, the light-emitting device 106 may provide, for example, a light source that operates in conjunction with an operation of the camera module 105. The light-emitting device 106 may include, for example, a light-emitting diode (LED), an infrared (IR) LED, and a xenon lamp.

The connector hole (108, 109) may include the first connector hole 108 that may accommodate a connector (e.g., a universal serial bus (USB) connector) for transmitting/receiving a power and/or data to/from an external electronic device, and/or the second connector hole (or an earphone jack) 109 that may accommodate a connector for transmitting/receiving an audio signal to/from the external electronic device.

Figure 3:
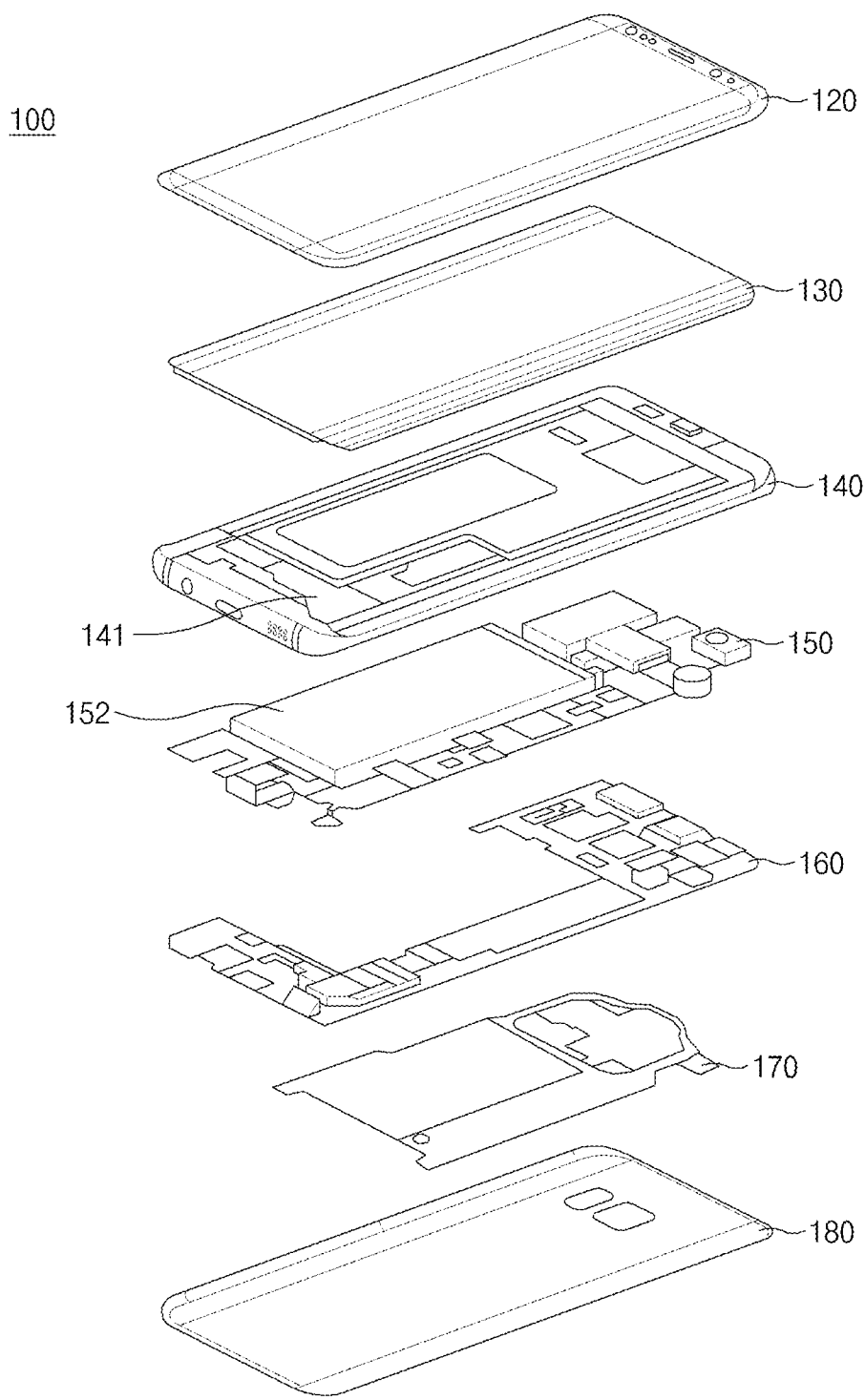
FIG. 3 illustrates an exploded perspective view of an electronic device of FIG. 1.

Referring to FIG. 3, the electronic device 100 may include a side bezel structure 140, a first support member 142 (e.g., a bracket), a front plate 120, a display 130, a printed circuit board 150, a battery 152, a second support member 160 (e.g., a rear case), an antenna 170, and a back plate 180. In an embodiment, the electronic device 100 may not include at least one (e.g., the first support member 142 or the second support member 160) of the components or may further include any other component. At least one of the components of the electronic device 100 may be identical or similar to at least one of the components of the electronic device 100 of FIG. 1 or 2, and thus, additional description will be omitted to avoid redundancy.

The first support member 142 may be positioned in the electronic device 100, and may be connected with the side bezel structure 140 or may be integrally formed with the side bezel structure 140. The first support member 142 may be formed of, for example, a metal material and/or a nonmetal material (e.g., a polymer). The display 130 may be coupled with one surface of the first support member 142, and the printed circuit board 150 may be coupled with an opposite surface of the display 130. A processor, a memory, and/or an interface may be mounted on the printed circuit board 150. For example, the processor may include one or more of a central processing unit, an application processor, a graphic processing device, an image signal processor, a sensor hub processor, or a communication processor.

The memory may include, for example, a volatile memory or a nonvolatile memory.

The interface may include, for example, a high definition multimedia interface (HDMI), a USB interface, a secure digital (SD) card interface, and/or an audio interface. The interface may electrically or physically connect, for example, the electronic device 100 with an external electronic device and may include a USB connector, an SD card/MMC connector, or an audio connector.

The battery 152 that is a device for supplying a power to at least one component of the electronic device 100 may include, for example, a primary cell incapable of being recharged, a secondary cell rechargeable, or a fuel cell. At least a portion of the battery 152 may be disposed on substantially the same plane as the printed circuit board 150, for example. The battery 152 may be integrally disposed in the electronic device 100, or may be disposed to be removable from the electronic device 100.

The antenna 170 may be interposed between the back plate 180 and the battery 152. The antenna 170 may include, for example, a near field communication (NFC) antenna, an antenna for wireless charging, and/or a magnetic secure transmission (MST) antenna. For example, the antenna 170 may perform short range communication with an external device or may wirelessly transmit/receive a power necessary to charge. In another embodiment, an antenna structure may be implemented with a part of the side bezel structure 140 and/or the first support member 142, or with a combination thereof.

Figure 4:
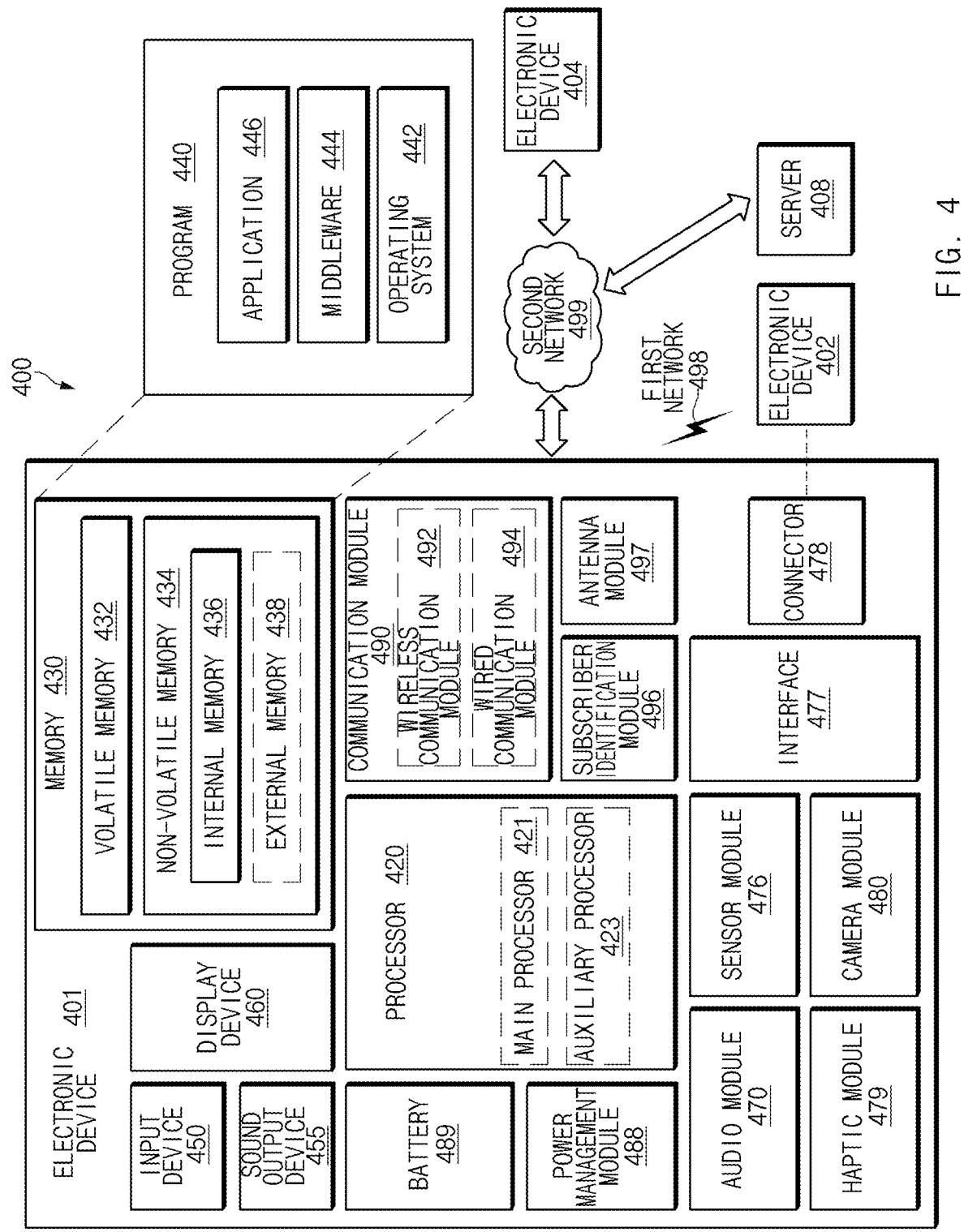
FIG. 4 illustrates a block diagram of an electronic device in a network environment, in various embodiments.

FIG. 4 illustrates a block diagram of an electronic device 401 in a network environment 400 according to various embodiments. Referring to FIG. 4, the electronic device 401 in the network environment 400 may communicate with an electronic device 402 via a first network 498 (e.g., a short-range wireless communication network), or an electronic device 404 or a server 408 via a second network 499 (e.g., a long-range wireless communication network). According to an embodiment, the electronic device 401 may communicate with the electronic device 404 via the server 408. According to an embodiment, the electronic device 401 may include a processor 420, memory 430, an input device 450, a sound output device 455, a display device 460, an audio module 470, a sensor module 476, an interface 477, a haptic module 479, a camera module 480, a power management module 488, a battery 489, a communication module 490, a subscriber identification module (SIM) 496, or an antenna module 497. In some embodiments, at least one (e.g., the display device 460 or the camera module 480) of the components may be omitted from the electronic device 401, or one or more other components may be added in the electronic device 401. In some embodiments, some of the components may be implemented as single integrated circuitry. For example, the sensor module 476 (e.g., a fingerprint sensor, an iris sensor, or an illuminance sensor) may be implemented as embedded in the display device 460 (e.g., a display).

The processor 420 may execute, for example, software (e.g., a program 440) to control at least one other component (e.g., a hardware or software component) of the electronic device 401 coupled with the processor 420, and may perform various data processing or computation. According to one embodiment, as at least part of the data processing or computation, the processor 420 may load a command or data received from another component (e.g., the sensor module 476 or the communication module 490) in volatile memory 432, process the command or the data stored in the volatile memory 432, and store resulting data in non-volatile memory 434. According to an embodiment, the processor 420 may include a main processor 421 (e.g., a central processing unit (CPU) or an application processor (AP)), and an auxiliary processor 423 (e.g., a graphics processing unit (GPU), an image signal processor (ISP), a sensor hub processor, or a communication processor (CP)) that is operable independently from, or in conjunction with, the main processor 421. Additionally or alternatively, the auxiliary processor 423 may be adapted to consume less power than the main processor 421, or to be specific to a specified function. The auxiliary processor 423 may be implemented as separate from, or as part of the main processor 421.

The auxiliary processor 423 may control at least some of functions or states related to at least one component (e.g., the display device 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). According to an embodiment, the auxiliary processor 423 (e.g., an image signal processor or a communication processor) may be implemented as part of another component (e.g., the camera module 480 or the communication module 490) functionally related to the auxiliary processor 423.

The memory 430 may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434.

The program 440 may be stored in the memory 430 as software, and may include, for example, an operating system (OS) 442, middleware 444, or an application 446.

The input device 450 may receive a command or data to be used by other component (e.g., the processor 420) of the electronic device 401, from the outside (e.g., a user) of the electronic device 401. The input device 450 may include, for example, a microphone, a mouse, a keyboard, or a digital pen (e.g., a stylus pen).

The sound output device 455 may output sound signals to the outside of the electronic device 401. The sound output device 455 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 460 may visually provide information to the outside (e.g., a user) of the electronic device 401. The display device 460 may include, for example, a display, a hologram device, or a projector and control circuitry to control a corresponding one of the display, hologram device, and projector. According to an embodiment, the display device 460 may include touch circuitry adapted to detect a touch, or sensor circuitry (e.g., a pressure sensor) adapted to measure the intensity of force incurred by the touch.

The audio module 470 may convert a sound into an electrical signal and vice versa. According to an embodiment, the audio module 470 may obtain the sound via the input device 450, or output the sound via the sound output device 455 or a headphone of an external electronic device (e.g., an electronic device 402) directly (e.g., wiredly) or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state. According to an embodiment, the sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device (e.g., the electronic device 402) directly (e.g., wiredly) or wirelessly. According to an embodiment, the interface 477 may include, for example, a high definition multimedia interface (HDMI), a universal serial bus (USB) interface, a secure digital (SD) card interface, or an audio interface.

A connecting terminal 478 may include a connector via which the electronic device 401 may be physically connected with the external electronic device (e.g., the electronic device 402). According to an embodiment, the connecting terminal 478 may include, for example, a HDMI connector, a USB connector, a SD card connector, or an audio connector (e.g., a headphone connector).

The haptic module 479 may convert an electrical signal into a mechanical stimulus (e.g., a vibration or a movement) or electrical stimulus which may be recognized by a user via his tactile sensation or kinesthetic sensation. According to an embodiment, the haptic module 479 may include, for example, a motor, a piezoelectric element, or an electric stimulator.

The camera module 480 may capture a still image or moving images. According to an embodiment, the camera module 480 may include one or more lenses, image sensors, image signal processors, or flashes.

The power management module 488 may manage power supplied to the electronic device 401. According to one embodiment, the power management module 488 may be implemented as at least part of, for example, a power management integrated circuit (PMIC).

The battery 489 may supply power to at least one component of the electronic device 401. According to an embodiment, the battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the application processor (AP)) and supports a direct (e.g., wired) communication or a wireless communication. According to an embodiment, the communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device via the first network 498 (e.g., a short-range communication network, such as Bluetooth™, wireless-fidelity (Wi-Fi) direct, or infrared data association (IrDA)) or the second network 499 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 492 may identify and authenticate the electronic device 401 in a communication network, such as the first network 498 or the second network 499, using subscriber information (e.g., international mobile subscriber identity (IMSI)) stored in the subscriber identification module 496.

The antenna module 497 may transmit or receive a signal or power to or from the outside (e.g., the external electronic device) of the electronic device 401. According to an embodiment, the antenna module 497 may include an antenna including a radiating element composed of a conductive material or a conductive pattern formed in or on a substrate (e.g., PCB). According to an embodiment, the antenna module 497 may include a plurality of antennas. In such a case, at least one antenna appropriate for a communication scheme used in the communication network, such as the first network 498 or the second network 499, may be selected, for example, by the communication module 490 (e.g., the wireless communication module 492) from the plurality of antennas. The signal or the power may then be transmitted or received between the communication module 490 and the external electronic device via the selected at least one antenna. According to an embodiment, another component (e.g., a radio frequency integrated circuit (RFIC)) other than the radiating element may be additionally formed as part of the antenna module 497.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 401 and the external electronic device 404 via the server 408 coupled with the second network 499. Each of the electronic devices 402 and 404 may be a device of a same type as, or a different type, from the electronic device 401. According to an embodiment, all or some of operations to be executed at the electronic device 401 may be executed at one or more of the external electronic devices 402, 404, or 408. For example, if the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401. The electronic device 401 may provide the outcome, with or without further processing of the outcome, as at least part of a reply to the request. To that end, a cloud computing, distributed computing, or client-server computing technology may be used, for example.

Figure 5:
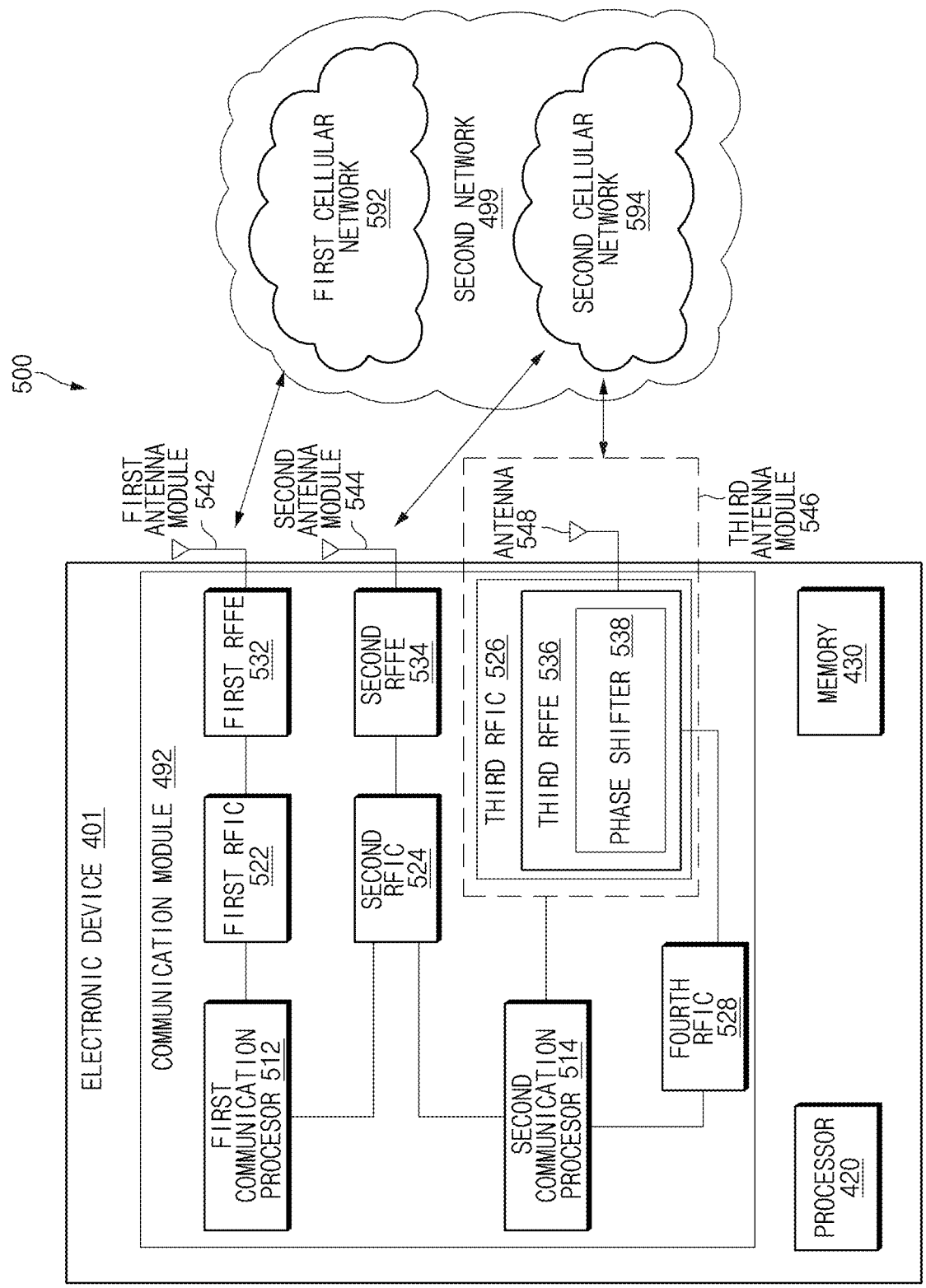
FIG. 5 illustrates a block diagram of an electronic device for supporting legacy network communication and 5G network communication, in various embodiments.

FIG. 5 illustrates a block diagram 500 of an electronic device 401 for supporting legacy network communication and 5G network communication, according to various embodiments. Referring to FIG. 5, the electronic device 401 may include a first communication processor 512, a second communication processor 514, a first radio frequency integrated circuit (RFIC) 522, a second RFIC 524, a third RFIC 526, a fourth RFIC 528, a first radio frequency front end (REFE) 532, a second REFE 534, a first antenna module 542, a second antenna module 544, and an antenna 548. The electronic device 401 may further include the processor 420 and the memory 430. A second network 499 may include a first cellular network 592 and a second cellular network 594. According to another embodiment, the electronic device 401 may further include at least one component of the components illustrated in FIG. 4, and the second network 499 may further include at least another network. According to an embodiment, the first communication processor 512, the second communication processor 514, the first RFIC 522, the second RFIC 524, the fourth RFIC 528, the first REFE 532, and the second REFE 534 may form at least a part of a wireless communication module 492. According to another embodiment, the fourth RFIC 528 may be omitted or may be included as a part of the third RFIC 526.

The first communication processor 512 may establish a communication channel for a band to be used for wireless communication with the first cellular network 592 and may support legacy network communication through the established communication channel. According to various embodiments, the first cellular network 592 may be a legacy network including a $2^{nd}$ generation (2G), $3^{rd}$ generation (3G), $4^{th}$ generation (4G), or long term evolution (LTE) network. The second communication processor 514 may establish a communication channel for a specified band (e.g., ranging from about 6 GHz to about 60 GHz) of bands to be used for wireless communication with the second cellular network 594 and may support 5G network communication through the established communication channel. According to various embodiments, the second cellular network 594 may be a 5G network defined in the 3GPP. Additionally, according to an embodiment, the first communication processor 512 or the second communication processor 514 may establish a communication channel for any other specified band (e.g., about 6 GHz or lower) of the bands to be used for wireless communication with the second cellular network 594 and may support 5G network communication through the established communication channel. According to an embodiment, the first communication processor 512 and the second communication processor 514 may be implemented in a single chip or a single package. According to various embodiments, the first communication processor 512 or the second communication processor 514 may be implemented in a single chip or a single package together with the processor 420, the auxiliary processor (e.g., 423 of FIG. 4), or the communication module 490.

Upon transmitting a signal, the first RFIC 522 may convert a baseband signal generated by the first communication processor 512 into a radio frequency (RF) signal of about 700 MHz to about 3 GHz that is used in the first cellular network 592. Upon receiving a signal, an RF signal may be obtained from the first cellular network 592 (e.g., a legacy network) through the first antenna module 542 and may be pre-processed through an REFE (e.g., the first REFE 532). The first RFIC 522 may convert the pre-processed RF signal into a baseband signal so as to be processed by the first communication processor 512.

Upon transmitting a signal, the second RFIC 524 may convert a baseband signal generated by the first communication processor 512 or the second communication processor 514 into an RF signal (hereinafter referred to as a "5G Sub6 RF signal") in a Sub6 band (e.g., about 6 GHz or lower). Upon receiving a signal, the 5G Sub6 RF signal may be obtained from the second cellular network 594 (e.g., a 5G network) through the second antenna module 544 and may be pre-processed through an REFE (e.g., the second REFE 534). The second RFIC 524 may convert the pre-processed 5G Sub6 RF signal into a baseband signal so as to be processed by a communication processor corresponding to the 5G Sub6 RF signal from among the first communication processor 512 or the second communication processor 514.

The third RFIC 526 may convert a baseband signal generated by the second communication processor 514 into an RF signal (hereinafter referred to as a "5G Above6 RF signal") in a 5G Above6 band (e.g., ranging from about 6 GHz to about 60 GHz) to be used in the second cellular network 594 (e.g., a 5G network). Upon receiving a signal, the 5G Above6 RF signal may be obtained from the second cellular network 594 (e.g., a 5G network) through an antenna (e.g., the antenna 548) and may be pre-processed through a third REFE 536. The third RFIC 526 may convert the pre-processed 5G Above6 RF signal into a baseband signal so as to be processed by the second communication processor 514. For example, the third RFFE 536 may perform a preprocessing of the signal using a phase shifter 538. According to an embodiment, the third REFE 536 may be implemented as a part of the third RFIC 526.

According to an embodiment, the electronic device 401 may include the fourth RFIC 528 independently of the third RFIC 526 or as at least a part of the third RFIC 526. In this case, the fourth RFIC 528 may convert a baseband signal generated by the second communication processor 514 into an RF signal (intermediate frequency signal, hereinafter referred to as an "IF signal") in an intermediate frequency band (e.g., ranging from about 9 GHz to about 11 GHz) and may provide the IF signal to the third RFIC 526. The third RFIC 526 may convert the IF signal into the 5G Above6 RF signal. Upon receiving a signal, the 5G Above6 RF signal may be received from the second cellular network 594 (e.g., a 5G network) through an antenna (e.g., the antenna 548) and may be converted into an IF signal by the third RFIC 526. The fourth RFIC 528 may convert the IF signal into a baseband signal so as to be processed by the second communication processor 514.

According to an embodiment, the first RFIC 522 and the second RFIC 524 may be implemented with at least a part of a single chip or a single package. According to an embodiment, the first REFE 532 and the second REFE 534 may be implemented with at least a part of a single chip or a single package. According to an embodiment, at least one of the first antenna module 542 or the second antenna module 544 may be omitted or may be combined with any other antenna module to process RF signals in a plurality of bands.

According to an embodiment, the third RFIC 526 and the antenna 548 may be disposed at the same substrate to form a third antenna module 546. For example, the wireless communication module 492 or the processor 420 may be disposed at a first substrate (e.g., a main PCB). In this case, the third RFIC 526 may be disposed in a partial region (e.g., on a lower surface) of a second substrate (e.g., a sub PCB) independent of the first substrate, the antenna 548 may be disposed in another partial region (e.g., on an upper surface) of the second substrate, and thus, the third RFIC 526 may be implemented with the third RFIC 526 and the antenna 548. According to an embodiment, the antenna 548 may include, for example, an antenna array to be used for beamforming. As the third RFIC 526 and the antenna 548 are disposed at the same substrate, it may be possible to decrease a length of a transmission line between the third RFIC 526 and the antenna 548. This may make it possible to reduce the loss (e.g., attenuation) due to the transmission line, with regard to a signal in a high-frequency band (e.g., ranging from about 6 GHz to about 60 GHz) that is used for the 5G network communication. As such, the electronic device 401 may improve the quality or speed of communication with the second cellular network 594 (e.g., a 5G network).

The second cellular network 594 (e.g., a 5G network) may be used independently of the first cellular network 592 (e.g., a legacy network) (e.g., stand-alone (SA)) or may be used in conjunction with the first cellular network 592 (e.g., non-stand alone (NSA)). For example, only an access network (e.g., a 5G radio access network (RAN) or a next generation RAN (NG RAN)) may be present in the 5G network, and a core network (e.g., a next generation core (NGC)) may be absent from the 5G network. In this case, the electronic device 401 may access the access network of the 5G network and may then access an external network (e.g., Internet) under control of the core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 530 so as to be accessed by any other component (e.g., the processor 520, the first communication processor 512, or the second communication processor 514).

Figures 6A, 6B:
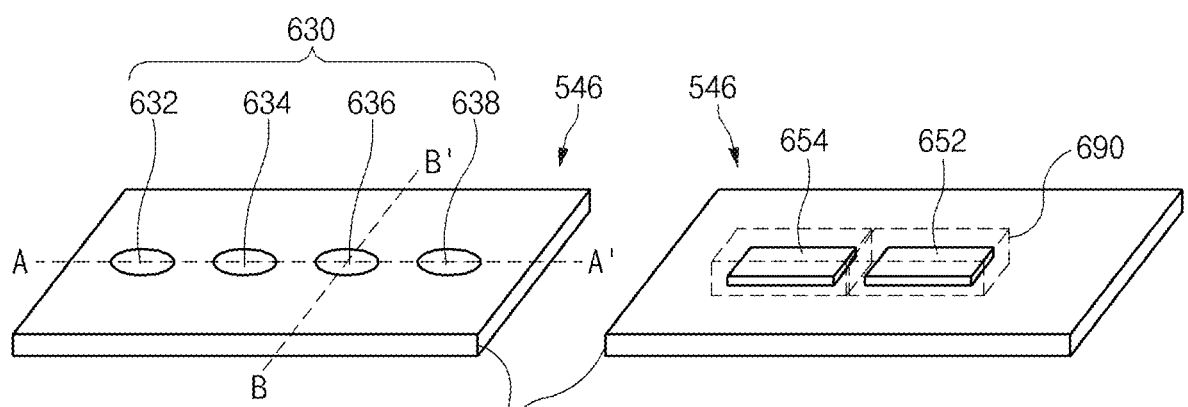
FIGS. 6A-6C illustrate an example of a structure of a third antenna module described with reference to FIG. 5, according to various embodiments.
Figure 6C:
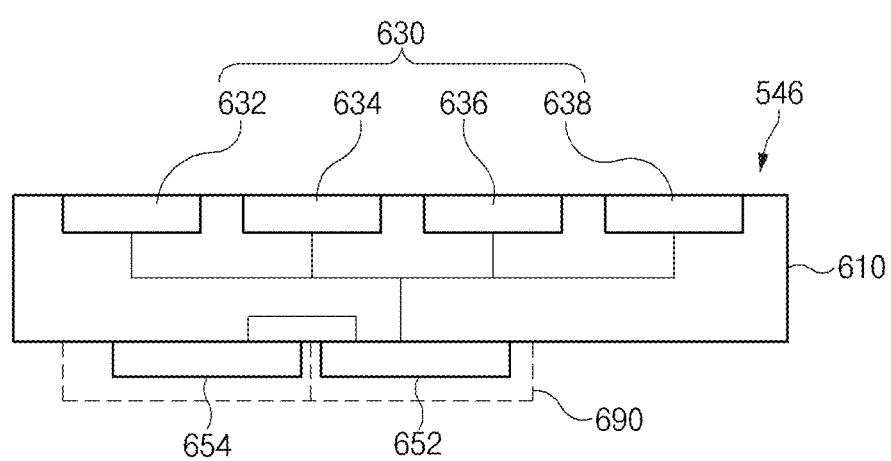

FIGS. 6A-6C illustrate embodiments of the structure of the third antenna module 546 of FIG. 5. FIG. 6A illustrates a perspective view of the third antenna module 546 viewed from one side. FIG. 6B illustrates a perspective view of the third antenna module 546 viewed from the other side. FIG. 6C illustrates a cross-sectional view of the third antenna module 546 taken along line A-A.

Referring to FIGS. 6A-6C, in an embodiment, the third antenna module 546 may include a printed circuit board 610, an antenna array 630, an RFIC 652, a power manage integrated circuit (PMIC) 654, and a module interface. Selectively, the third antenna module 546 may further include a shielding member 690. In various embodiments, at least one of the above components may be omitted, or at least two of the components may be integrally formed.

The printed circuit board 610 may include a plurality of conductive layers and a plurality of non-conductive layers, and the conductive layers and the non-conductive layers may be alternately stacked. The printed circuit board 610 may provide electrical connection with various electronic components, which are disposed on the printed circuit board 610 or on the outside, by using wires and conductive vias formed in the conductive layers.

The antenna array 630 (e.g., 548 of FIG. 5) may include a plurality of antenna elements 632, 634, 636, and 638 disposed to form a directional beam. The antenna elements 632, 634, 636, and 638 may be formed on a first surface of the printed circuit board 610 as illustrated. According to various embodiments, the antenna array 630 may be formed in the printed circuit board 610. According to embodiments, the antenna array 630 may include a plurality of antenna arrays (e.g., a dipole antenna array and/or a patch antenna array), the shapes or kinds of which are identical or different.

The RFIC 652 (e.g., third RFIC 526 of FIG. 5) may be disposed on another region (e.g., a second surface opposite to the first surface) of the printed circuit board 610 so as to be spaced from the antenna array 630. The RFIC 652 may be configured to process a signal in a selected frequency band, which is transmitted/received through the antenna array 630. According to an embodiment, upon transmitting a signal, the RFIC 652 may convert a baseband signal obtained from a communication processor (not illustrated) into an RF signal. Upon receiving a signal, the RFIC 652 may convert an RF signal received through the antenna array 630 into a baseband signal and may provide the baseband signal to the communication processor.

According to another embodiment, upon transmitting a signal, the RFIC 652 may up-convert an IF signal (e.g., about 9 GHz to about 11 GHz) obtained from an intermediate frequency integrated circuit (IFIC) (e.g., fourth RFIC 528 of FIG. 5) into an RF signal. Upon receiving a signal, the RFIC 652 may down-convert an RF signal obtained through the antenna array 630 into an IF signal and may provide the IF signal to the IFIC.

The PMIC 654 may be disposed on another region (e.g., the second surface) of the printed circuit board 610 so as to be spaced from the antenna array 630. The PMIC 654 may be supplied with a voltage from a main PCB (not illustrated) and may provide a power necessary for various components (e.g., the RFIC 652) on an antenna module.

The shielding member 690 may be disposed on a portion (e.g., on the second surface) of the printed circuit board 610 such that at least one of the RFIC 652 or the PMIC 654 is electromagnetically shielded. According to an embodiment, the shielding member 690 may include a shield can.

Although not illustrated, in various embodiments, the third antenna module 546 may be electrically connected with another printed circuit board (e.g., a main circuit board) through a module interface. The module interface may include a connection member, for example, a coaxial cable connector, a board to board connector, an interposer, or a flexible printed circuit board (FPCB). The RFIC 652 and/or the PMIC 654 of the third antenna module 546 may be electrically connected with the printed circuit board 610 through the connection member.

Figure 7:
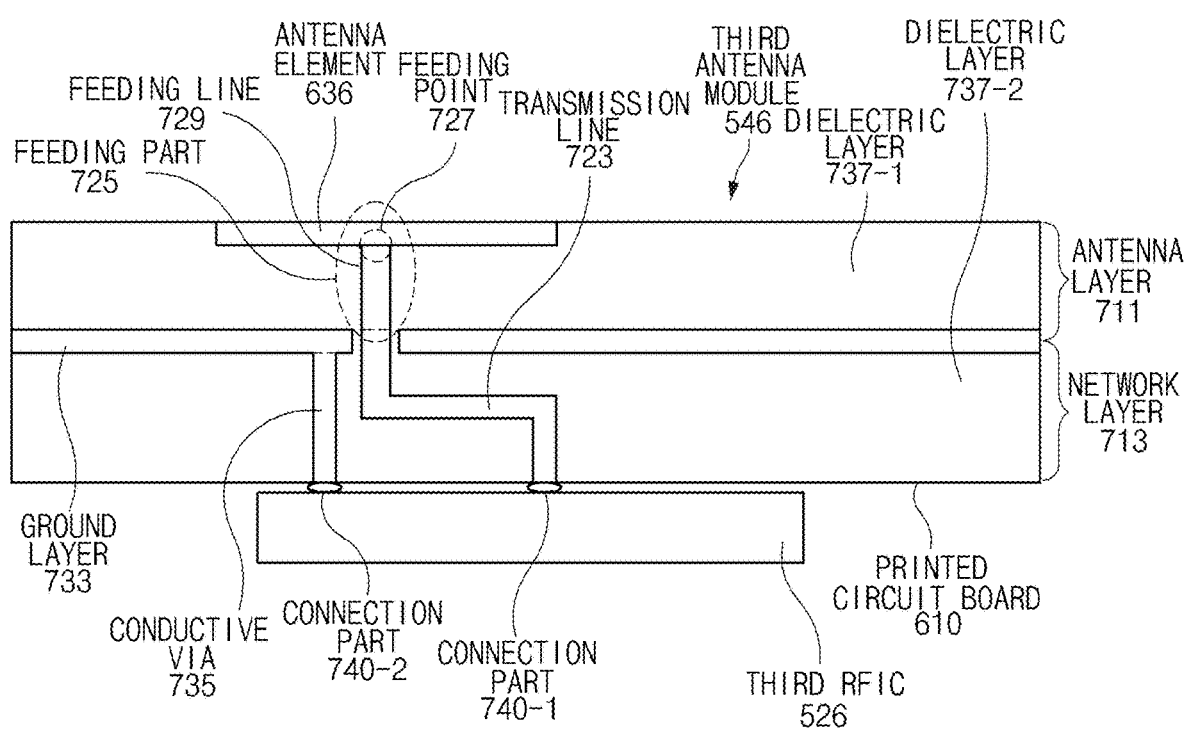
FIG. 7 illustrates a cross-sectional view of a third antenna module taken along a line B-B' of FIG. 6A, according to various embodiments.

FIG. 7 illustrates a cross section of line B-B of a third antenna module 546 shown in FIG. 6A. The printed circuit board 610 of an embodiment illustrated may include an antenna layer 711 and a network layer 713.

The antenna layer 711 may include at least one dielectric layer 737-1, and an antenna element 636 and/or a feeding part 725 formed on an outer surface of the dielectric layer 737-1 or therein. The feeding part 725 may include a feeding point 727 and/or a feeding line 729.

The network layer 713 may include at least one dielectric layer 737-2; and at least one ground layer 733, at least one conductive via 735, a transmission line 723, and/or the feeding line 729, which are formed on an outer surface of the dielectric layer 737-2 or therein.

In addition, in the embodiment illustrated, the third RFIC 526 of FIG. 5 may be electrically connected with the network layer 713, for example, through first and second connection parts (e.g., solder bumps) 740-1 and 740-2. In various embodiments, various connection structures (e.g., soldering or a ball grid array (BGA)). The third RFIC 526 may be electrically connected with the antenna element 636 through the first connection part 740-1, the transmission line 723, and the feeding part 725. Also, the third RFIC 526 may be electrically connected with the ground layer 733 through the second connection part 740-2 and the conductive via 735. Although not illustrated, the third RFIC 526 may also be electrically connected with the above module interface through the feeding line 729.

Figure 8A:
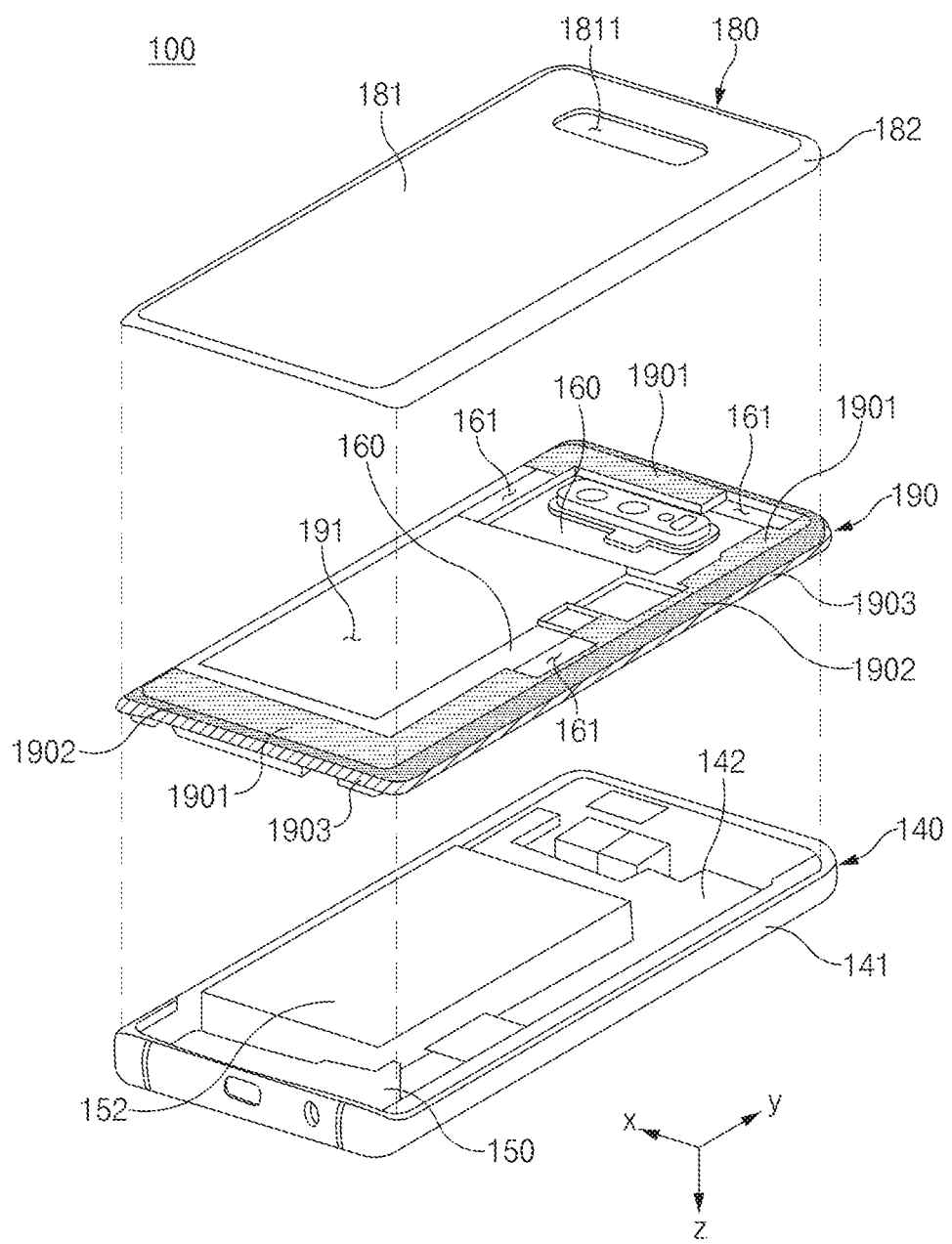
FIG. 8A illustrates an exploded perspective view of an electronic device according to an embodiment.
Figure 8B:
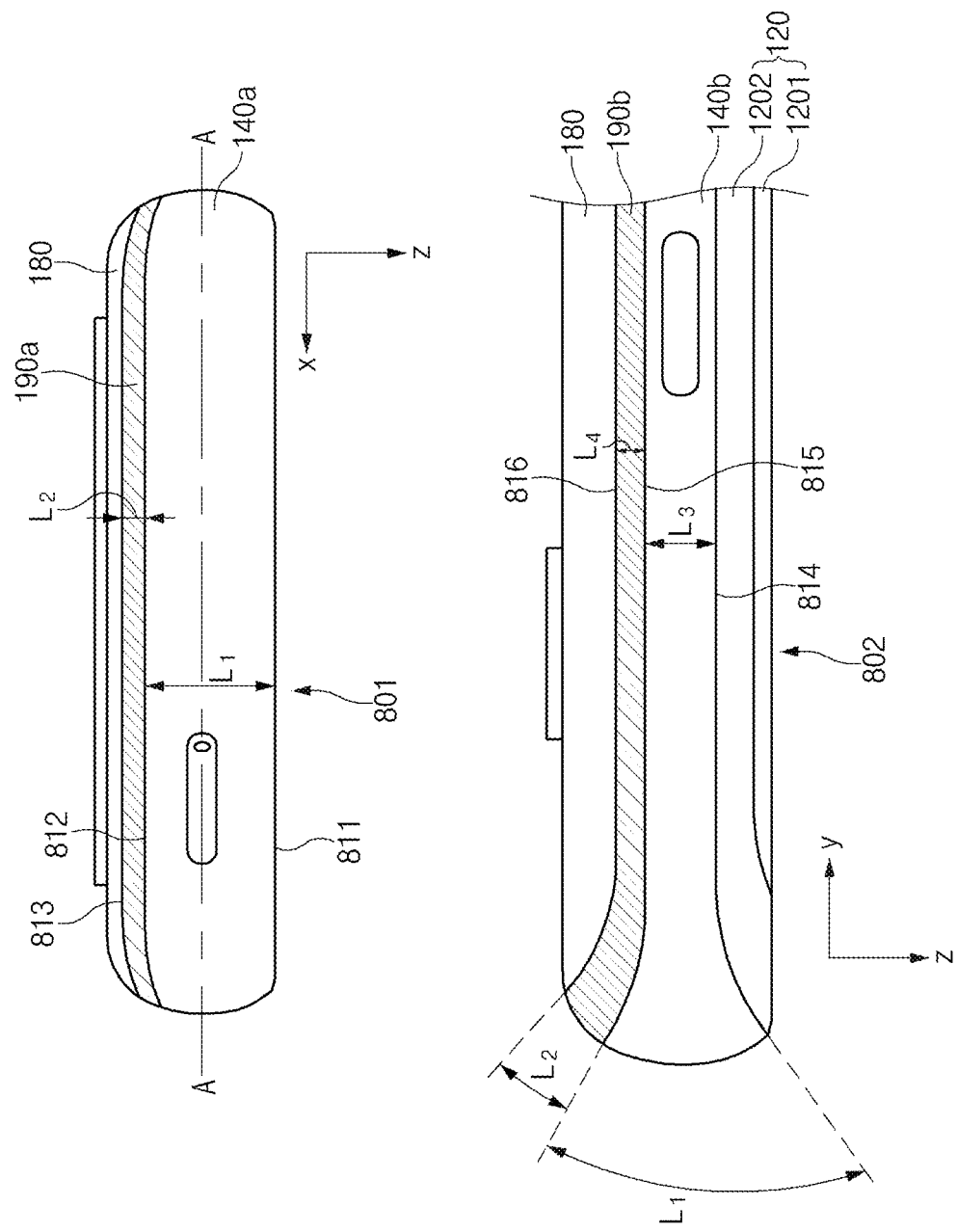
FIG. 8B illustrates a side view of a portion of an electronic device according to an embodiment.

FIG. 8A illustrates an exploded perspective view of the electronic device 100 according to an embodiment. FIG. 8B illustrates a side view of a portion of the electronic device 100 according to an embodiment.

Referring to FIGS. 8A and 8B, the electronic device 100 may include a second cover 180 forming a second surface (e.g., a surface facing a negative direction of the z axis) of the electronic device 100, a first side member 140 forming a third surface (e.g., a side surface) of the electronic device 100, a rear case 160 interposed between the second cover 180 and the first side member 140, and a second side member 190 interposed between the second cover 180 and the first side member 140.

The second cover 180 may include a central portion 181 and an edge portion 182 surrounding the central portion 181. A camera region 1811 that is transparently formed such that a camera included in the electronic device 100 is viewable through a second surface of the electronic device 100 may be formed in the central portion 181 of the second cover 180. The edge portion 182 of the second cover 180 may be bent toward the second side member 190 with a given curvature.

In various embodiments, the central portion 181 of the second cover 180 may be formed in the shape of a flat surface. In an embodiment, the central portion 181 of the second cover 180 may be formed in the shape of a curved surface.

Referring to FIG. 8A, the second cover 180 and the second side member 190 may be connected by connecting the edge portion 182 of the second cover 180 with a third edge portion 1903.

In an embodiment, the second side member 190 may be formed to surround the rear case 160. The second side member 190 may include a first edge portion 1901 where the rear case 160 is disposed, a second edge portion 1902 surrounding the first edge portion 1901, and the third edge portion 1903 forming the exterior of the electronic device 100.

According to the embodiment illustrated, the rear case 160 may be interposed between the second cover 180 and the printed circuit board 150. A swelling hole may be formed at a plate portion 142 in consideration of the case where a battery swells when the battery is charged. The swelling hole may be defined in a region corresponding to at least a portion of the battery.

At least a portion of the first edge portion 1901 and the second edge portion 1902 of the second side member 190 may be formed in the shape of a curved surface corresponding to a curved surface of the edge portion 182 of the second cover 180.

Referring to FIG. 8A, the third edge portion 1903 may be formed with substantially the same curved surface as the curved surface of the edge portion 182 of the second cover 180 or with substantially the same flat surface. Alternatively, the third edge portion 1903 may be formed with substantially the same curved surface or substantially the same flat surface as an edge portion 141 of the first side member 140. For example, the third edge portion 1903 may be formed with a curved surface that is continuous with the edge portion 182 of the second cover 180. In various embodiments, the second side member 190 and the first side member 140 may be formed of different materials. For example, the first side member 140 may include a metal material, and the second side member 190 may include a polymer material. This is for maintaining the performance of radiation of an antenna module 200 included in the rear case 160 that is coupled with or disposed in the second side member 190, which will be more fully described later.

The rear case 160 may include one or more antenna regions where the antenna module 200 is able to be disposed. In this case, the antenna region may include a recess 161 into which the antenna module 200 is able to be inserted.

In an embodiment, the first side member 140 may include the plate portion 142, in which the printed circuit board 150 and the battery 152 are disposed, and the edge portion 141 surrounding the plate portion 142.

A display (e.g., the display 130 of FIG. 3) may be disposed in a front direction (e.g., a negative direction of the z axis) with respect to the plate portion 142, and the printed circuit board 150 and the rear case 160 may be disposed in order in a back direction (e.g., a positive direction of the z axis) with respect to the plate portion 142.

In an embodiment, the first side member 140 may form a considerable portion of a side surface of the electronic device 100 together with the second side member 190. For example, the edge portion 141 of the first side member 140 may form a considerable portion of an outer surface (e.g., a side surface) of the electronic device 100 together with the third edge portion 1903 of the second side member 190. The edge portion 141 of the first side member 140 may be formed of a different material from the third edge portion 1903 of the second side member 190. For example, the edge portion 141 of the first side member 140 may include a metal material, and the third edge portion 1903 of the second side member 190 may include a polymer material.

Referring to FIG. 8B, the edge portion 182 of the second cover 180, the third edge portion 1903 of the second side member 190, the edge portion 141 of the first side member 140, and a first cover (not illustrated) (e.g., the front plate 120 of FIG. 3) may form a portion of an outer surface (e.g., a first surface and a third surface) of the electronic device 100. The first side member 140 and the second side member 190 may be formed between the first cover (e.g., the front plate 120 of FIG. 3) and the second cover 180 (e.g., the back plate 180 of FIG. 3).

Referring to FIG. 8B, the first cover 120 may include a transparent region 1201 where a display (e.g., the display 130 of FIG. 3) is able to be exposed and an opaque region 1202 (e.g., a bezel region) surrounding at least a portion of the transparent region 1201. In the embodiment illustrated, the opaque region 1202 may be formed in the shape of a curved surface, but the disclosure is not limited thereto. For example, the opaque region 1202 may be formed in the shape of a flat surface.

Referring to FIG. 8B, 801 illustrates a first portion 140a of the first side member 140 and a first portion 190a of the second side member 190, and 802 illustrates a second portion 140*b* of the first side member 140 and a second portion 190*b* of the second side member 190.

Referring to 801 of FIG. 8B, the first portion 140*a* of the first side member 140 may be thicker than the second portion 140*b* in thickness. Referring to 801 of FIG. 8B, the first portion 190*a* of the second side member 190 may be thicker than the second portion 190*b* in thickness.

Referring to 801, the first portion 140*a* of the first side member 140 may be extended from a first edge 811 where the first portion 140*a* of the first side member 140 and the first cover 120 are formed, to a second edge 812 where the first portion 140*a* of the first side member 140 and the first portion 190*a* of the second side member 190 are formed, as much as "L1".

Referring to 801, the first portion 190*a* of the second side member 190 may be extended from the second edge 812 to a third edge 813 where the first portion 190*a* of the second side member 190 and the second cover 180 are formed, as much as "L2".

Likewise, referring to 802, the second portion 140*b* of the first side member 140 may be extended from a fourth edge 814 where the second portion 140*b* of the first side member 140 and the first cover 120 are formed, to a fifth edge 815 where the second portion 140*b* of the first side member 140 and the second portion 190*b* of the second side member 190 are formed, as much as "L3".

Referring to 802, the second portion 190*b* of the second side member 190 may be extended from the fifth edge 815 to a sixth edge 816 where the second portion 190*b* of the second side member 190 and the second cover 180 are formed, as much as "L4".

In an embodiment, "L1" may be longer than "L2". "L3" may be longer than "L4".

In an embodiment, the first side member 140 may be formed such that the thickness (e.g., L1) of the first portion 140*a* is greater than the thickness (e.g., L3) of the second portion 140*b*. In an embodiment, the second side member 190 may be formed such that the thickness (e.g., L2) of the first portion 190*a* is greater than the thickness (e.g., L4) of the second portion 190*b*.

In the embodiment illustrated in FIG. 8B, the first side member 140 forming the third surface of the electronic device 100 may include an edge portion (e.g., the edge portion 141 of FIG. 8A) of the first side member 140. The second side member 190 forming the third surface of the electronic device 100 may include a third edge portion (e.g., the third edge portion 1903 of FIG. 8A) of the second side member 190.

Figure 9A:
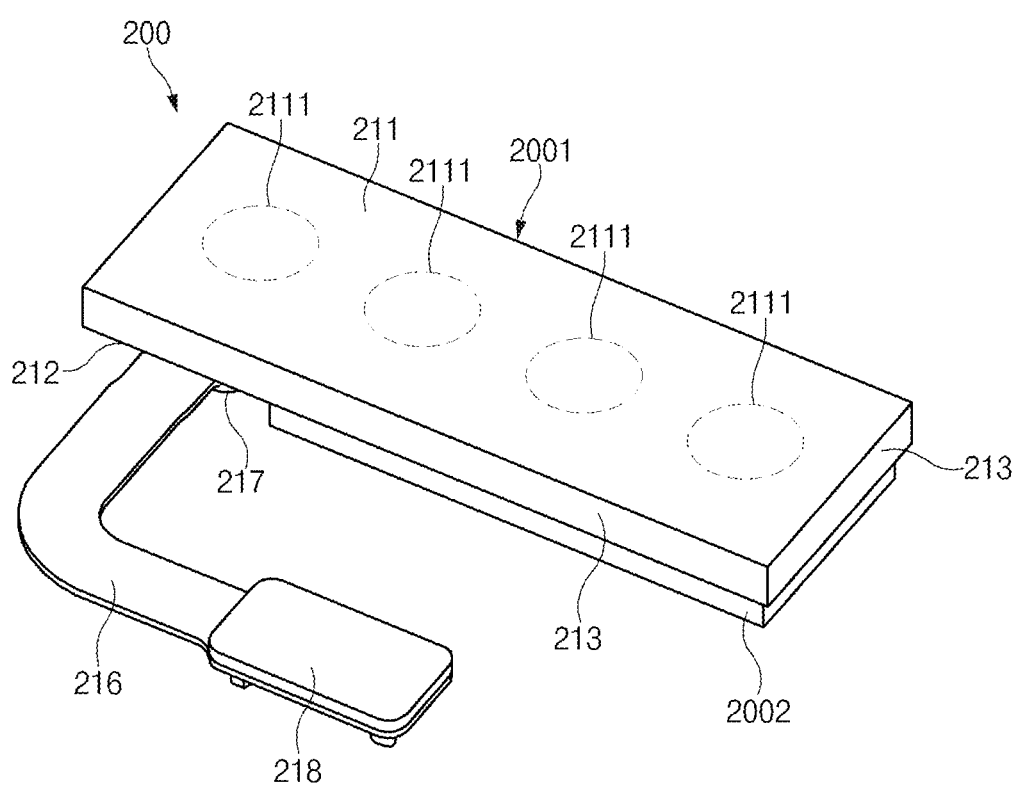
FIG. 9A illustrates a perspective view of an antenna module of an electronic device according to an embodiment.
Figure 9B:
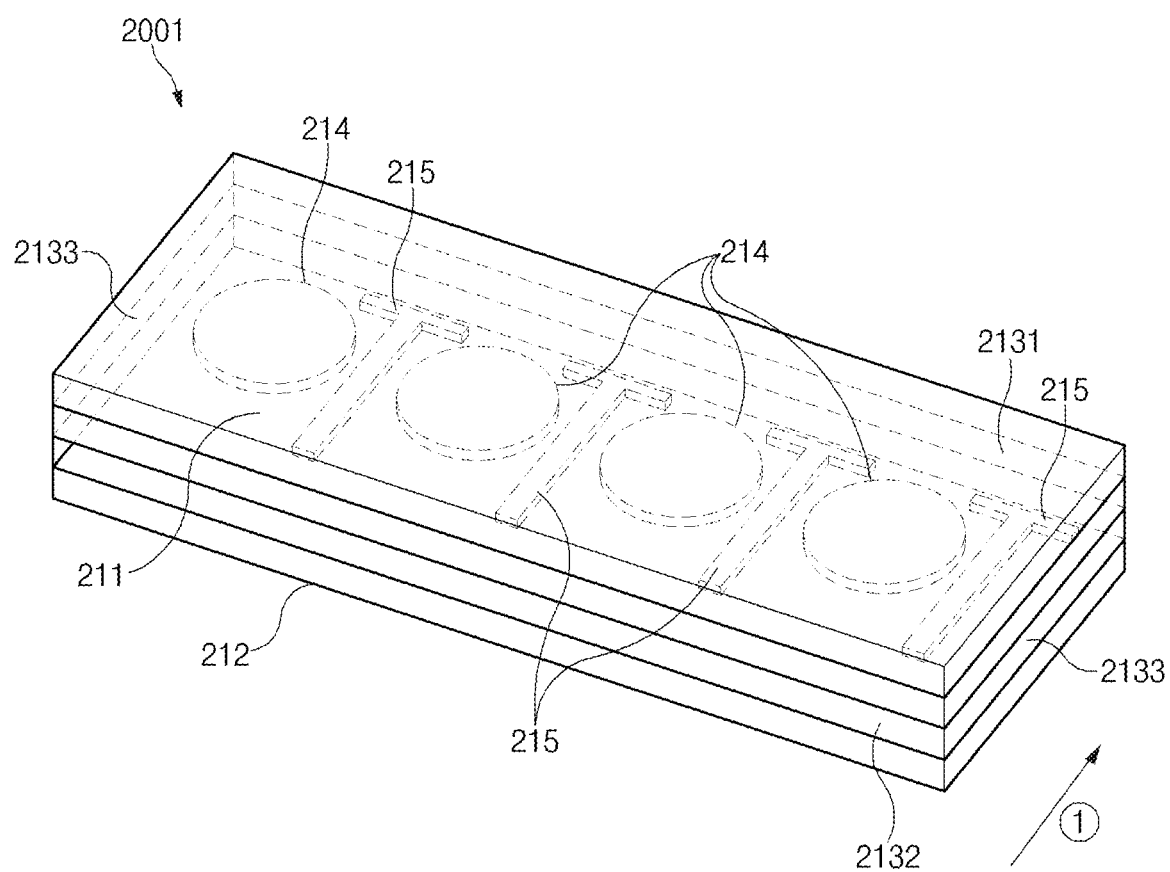
FIG. 9B illustrates a perspective view of an antenna substrate of an antenna module of an electronic device according to an embodiment.

FIG. 9A illustrates a perspective view of an antenna module of an electronic device according to an embodiment. FIG. 9B illustrates a perspective view of the interior of an antenna substrate of an antenna module illustrated in FIG. 9A, in an embodiment.

Referring to FIGS. 9A and 9B, the antenna module 200 of the electronic device 100 according to an embodiment may include an antenna substrate 2001, an RFIC module 2002, and a cable 216.

Referring to FIG. 9A, the antenna substrate 2001 may include a first surface 211 where a radiation region 2111 for radiating a first RF signal is formed, a second surface 212 opposite to the first surface 211, and a third surface 213 between the first surface 211 and the second surface 212. The radiation region 2111 may be formed on the first surface 211.

The radiation region 2111 may be formed by a conductive pattern that is formed on the first surface 211 of the antenna substrate 2001, or may be formed by a conductive pattern (e.g., a first antenna element 214) that is formed in a part of a plurality of layers included in the antenna substrate 2001 as illustrated in FIG. 9B.

In the embodiment illustrated, the RFIC module 2002 may be disposed on the second surface 212. In this case, the RFIC module 2002 may include an RFIC (e.g., the third RFIC 526 of FIG. 4), a heat dissipation member for cooling heat generated from the RFIC, and a shielding member for blocking an electromagnetic wave. A connector 217 that is coupled with the cable 216 may be formed on the second surface 212.

Referring to FIG. 9B, the antenna substrate 2001 may include a plurality of layers. The third surface 213 of the antenna substrate 2001 may include a (3-1)-th surface 2131 where a second antenna element 215 is extended, a (3-2)-th surface 2132 opposite to the (3-1)-th surface 2131, and a (3-3)-th substrate 2133 connecting the (3-1)-th surface 2131 and the (3-2)-th surface 2132.

The first antenna element 214 and the second antenna element 215 may be formed in the plurality of layers. The first antenna element 214 may form the radiation region 2111 illustrated in FIG. 9A. In this case, the first antenna element 214 may be formed on the first surface 211 of the antenna module 200 or may be formed in a specified region of one or more layers of the plurality of layers. Here, the specified region may be a region corresponding to the radiation region 2111 formed on the first surface 211 of FIG. 9A.

In an embodiment, the second antenna element 215 may be formed in at least one layer of the plurality of layers. The second antenna element 215 may be extended in a direction facing at least one of the surfaces 2131, 2132, and 2133, and the second RF signal may be radiated by the second antenna element 215. In various embodiments, the second antenna element 215 may be formed in the same layer as the first antenna element 214.

In an embodiment, a region that is formed by the first antenna element 214 for radiating the first RF signal may be referred to as a "first radiation region" (e.g., the radiation region 2111 of FIG. 9A). Also, a region that is formed by the second antenna element 215 for radiating the second RF signal may be referred to as a "second radiation region". The second radiation region may include a surface (e.g., the (3-1)-th surface 2131 of FIG. 9B) that the second antenna element 215 faces, or a surface from which the second RF signal is radiated.

In the embodiment illustrated, the second radiation region, or the (3-1)-th surface 2131 where the second antenna element 215 is extended may face direction ①. Here, direction ① may be a direction facing an outer side of a housing structure, which will be described later.

In various embodiments, the second antenna element 215 may include a dipole antenna.

In various embodiments, the antenna module 200 may radiate the first RF signal through the first surface 211 and may radiate the second RF signal through the (3-1)-th surface 2131.

Figure 10:
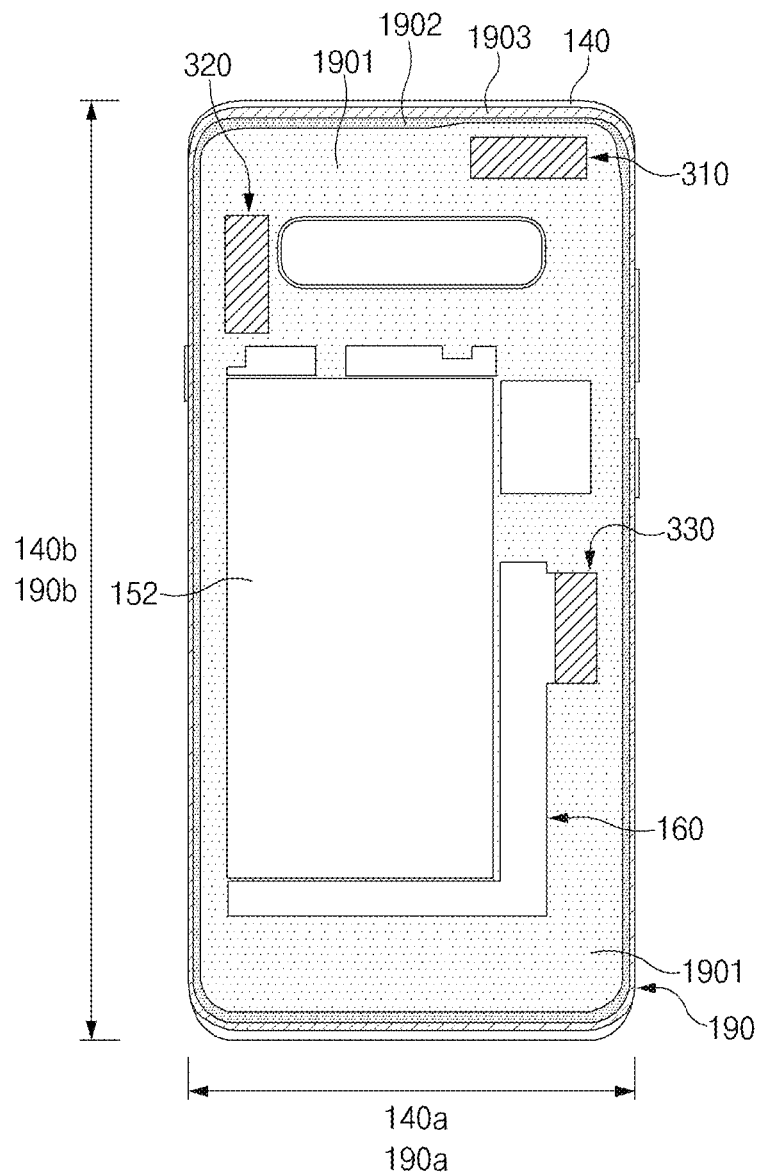
FIG. 10 illustrates a view of a layout of an antenna module of an electronic device according to an embodiment.

FIG. 10 illustrates a view of a layout of the antenna module 200 of the electronic device 100 according to an embodiment.

Referring to FIG. 10, the electronic device 100 may include one or more antenna modules 310, 320, and 330 disposed at the rear case 160. The antenna modules 310, 320, and 330 may include the first antenna module 310 disposed on the top of a back surface of the electronic device 100 illustrated in FIG. 10, the second antenna module 320 disposed on the left thereof, and the third antenna module 330 disposed on the right thereof. The antenna modules 310, 320, and 330 may be disposed on a surface facing a back surface of the rear case 160 (e.g., a direction facing the second cover 180 of FIG. 8A). Here, the antenna modules 310, 320, and 330 may be disposed at the rear case 160 such that a first surface (e.g., the first surface 211 illustrated in FIGS. 9A and 9B) faces a second surface of an electronic device (e.g., a surface that the second cover 180 of FIG. 3 forms).

In various embodiments, the first antenna module 310 may be disposed adjacent to the first portion 140a of the first side member 140 and/or the first portion 190a of the second side member 190. The second antenna module 320 and the third antenna module 330 may be disposed adjacent to the second portion 140b of the first side member 140 and/or the second portion 190b of the second side member 190.

In an embodiment, a second cover (e.g., the second cover 180 of FIG. 8A) may be disposed on the surface where the antenna modules 310, 320, and 330 of the rear case 160 are disposed, so as to cover the antenna modules 310, 320, and 330. A portion of an edge of the rear case 160 may be covered by the first edge portion 1901 and the second edge portion 1902 of the second side member 190, when viewed from the back surface of the electronic device 100.

Figure 11:
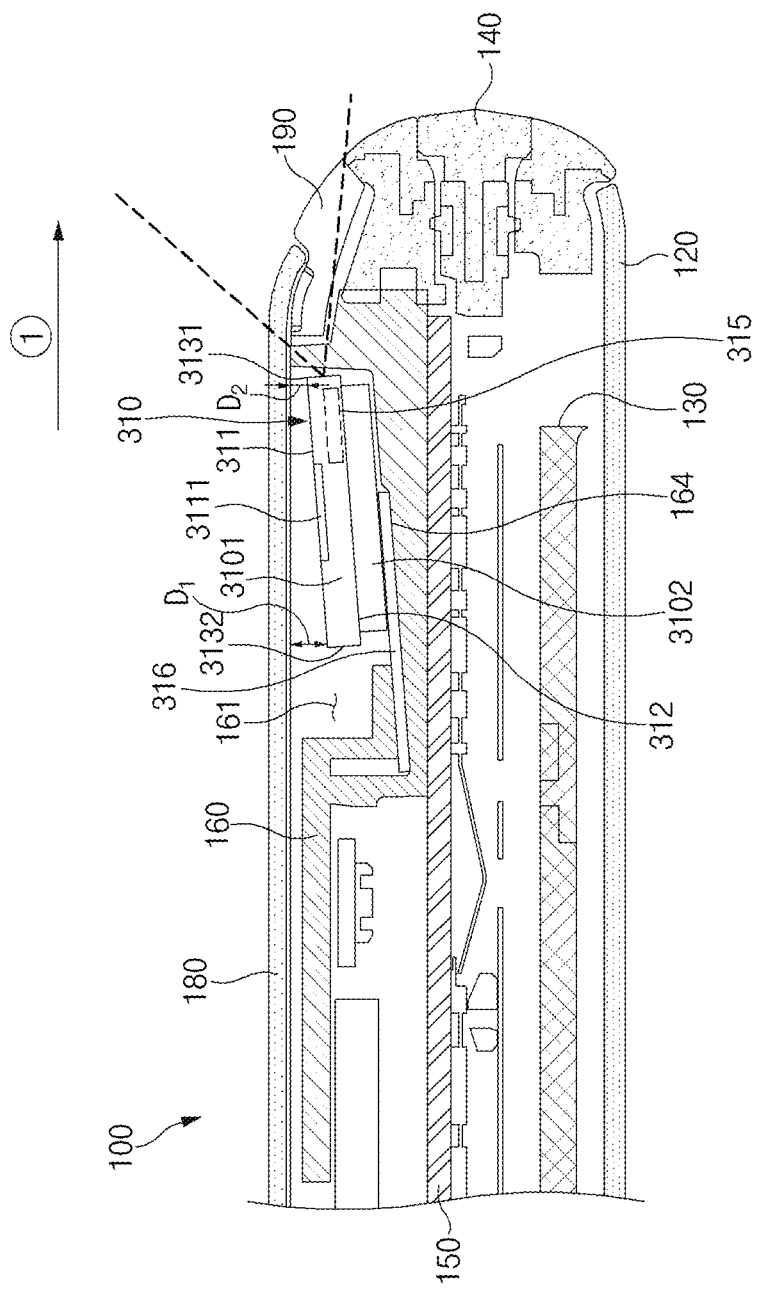
FIG. 11 illustrates a view of a layout of a first antenna module of an electronic device according to an embodiment.

FIG. 11 illustrates a cross-sectional view of the electronic device 100 where the first antenna module 310 is disposed, according to an embodiment.

In an embodiment, the electronic device 100 may include the second cover 180 forming the second surface (e.g., a back surface) of the electronic device 100, the first cover 120 forming the first surface (e.g., a front surface) of the electronic device 100, and the first side member 140 and the second side member 190 forming the third surface (e.g., a side surface) of the electronic device 100.

In an embodiment, the electronic device 100 may include an inner space formed by the first cover 120, the second cover 180, the first side member 140, and the second side member 190. The one or more printed circuit board 150, the display 130, or the rear case 160 may be disposed in the inner space.

In an embodiment, the display 130 may be disposed below the first cover 120 so as to face the first cover 120. The printed circuit board 150 may be disposed below the display 130 or may be disposed on a surface facing the first cover 120 of the rear case 160 (e.g., a lower surface with respect to a drawing). The recess 161 where the first antenna module 310 is disposed may be formed at the rear case 160.

In an embodiment, the first antenna module 310 may include a first surface 311 (e.g., the first surface 211 of FIG. 9B), a second surface 312 on which an RFIC module 3102 (e.g., the RFIC module 2002 of FIG. 9A) is disposed and which is opposite to the first surface 311, and third surfaces 3131 and 3132 (e.g., the third surfaces 2131 and 2132 of FIG. 9B) between the first surface 311 and the second surface 312. In this case, a first radiation region 3111 (e.g., the first radiation region 2111 of FIG. 9B) where the first RF signal is radiated may be formed on the first surface 311, and a second radiation region (e.g., a (3-1)-th surface 3131) (e.g., the (3-1)-th surface 2131 of FIG. 9B) where the second RF signal is radiated may be formed on at least a part of the third surfaces 3131 and 3132. The second radiation region may be included in the (3-1)-th surface 3131.

In an embodiment, the first antenna module 310 may be disposed in the recess 161 formed at the rear case 160 such that the first radiation region 3111 faces the second cover 180 and such that the second radiation region (e.g., the (3-1)-th surface 3131) faces the second side member 190.

For example, the first antenna module 310 may be disposed such that the first surface 311 faces the second cover 180 to make a given angle with the second cover 180 and such that the (3-1)-th surface 3131 faces an outer side of the electronic device 100. For example, the first antenna module 310 may be disposed to be inclined at a given angle with respect to the second cover 180 such that a radiation range (e.g., a range marked by a dotted line in a drawing) of the second RF signal radiated from the second radiation region formed in the (3-1)-th surface 3131 is not covered by the first side member 140.

In various embodiments, the second cover 180 and the first antenna module 310 may be spaced from each other as much as a given distance. As it goes from an inner side of the electronic device 100 toward an outer side of the electronic device 100, a distance between the first surface 311 of the first antenna module 310 and the second cover 180 may decrease.

Referring to FIG. 11, a first region, which is adjacent to a surface (e.g., a (3-2)-th surface 3132) opposite to the radiation surface, of the first surface 311 of the first antenna module 310 may be spaced from the second cover 180 as much as a first distance D1, and a second region, which is adjacent to the radiation surface (e.g., the (3-1)-th surface 3131) where the second RF signal is radiated, of the first surface 311 of the first antenna module 310 may be spaced from the second cover 180 as much as a second distance D2.

Here, the first distance D1 may be greater than the second distance D2. That is, the radiation surface (e.g., the (3-1)-th surface 3131) may be disposed to be inclined toward the second cover 180 so as to face a portion of a side member (e.g., the first side member 140 and the second side member 190) and a portion of the second cover 180. As such, a radiation range of the second RF signal may be determined such that the second RF signal passes through the second side member 190 and the second cover 180.

In various embodiments, the first antenna module 310 may be disposed at the rear case 160 such that the first radiation region 3111 faces the second surface of the electronic device 100 (e.g., a surface that the second cover 180 forms) and such that the second radiation region (e.g., the (3-1)-th surface 3131) faces the third surface of the electronic device 100 (e.g., a surface that the first side member 140 and the second side member 190 form).

In the embodiment illustrated, the first antenna module 310 may be disposed to make a given angle with the second cover 180. In this case, an angle formed by the first antenna module 310 and the second cover 180 may be an angle formed by a direction (e.g., a normal vector of the first surface 311) that the first surface 311 of the first antenna module 310 faces and a direction (e.g., a normal vector of the second cover 180) that the second cover 180 faces. For example, the given angle may be 0 degree to 15 degrees. In the embodiment illustrated, the first surface 311 of the first antenna module 310 may be perpendicularly connected with the (3-1)-th surface 3131 where the second radiation region is formed. Accordingly, the (3-1)-th surface 3131 of the first antenna module 310 may be disposed to be inclined toward the second cover 180 as much as a given angle with respect to a direction (e.g., direction ①) perpendicular to a normal vector of the second cover 180.

In various embodiments, the second cover 180 may include a flat portion and a curved portion surrounding the flat portion. In this case, an angle formed by the first antenna module 310 and the second cover 180 may be an angle formed by a normal vector of the flat portion of the second cover 180 and a normal vector of the first surface 311 of the first antenna module 310.

Figure 12A:
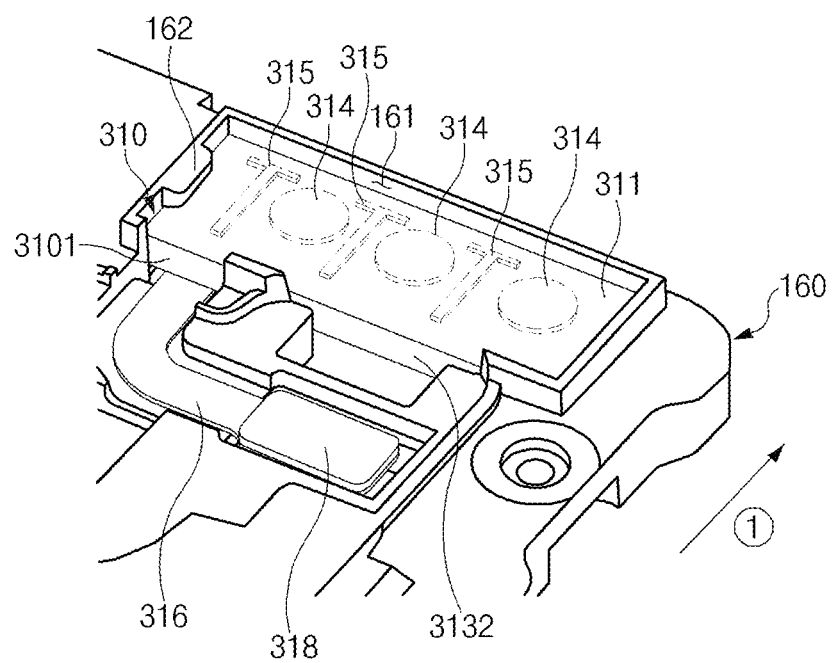
FIG. 12A illustrates a view of a first antenna module of an electronic device and a rear case where a first antenna module is disposed, according to an embodiment.
Figure 12B:
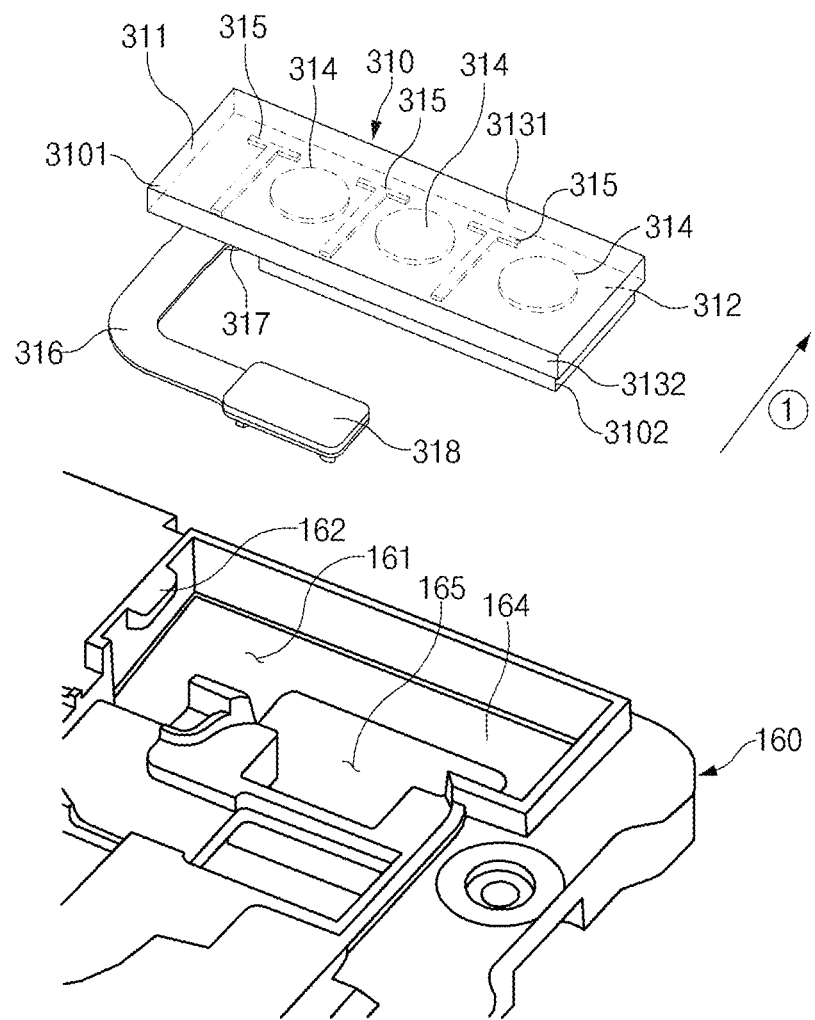
FIG. 12B illustrates an exploded perspective view of a first antenna module and a rear case, according to an embodiment.
Figure 12C:
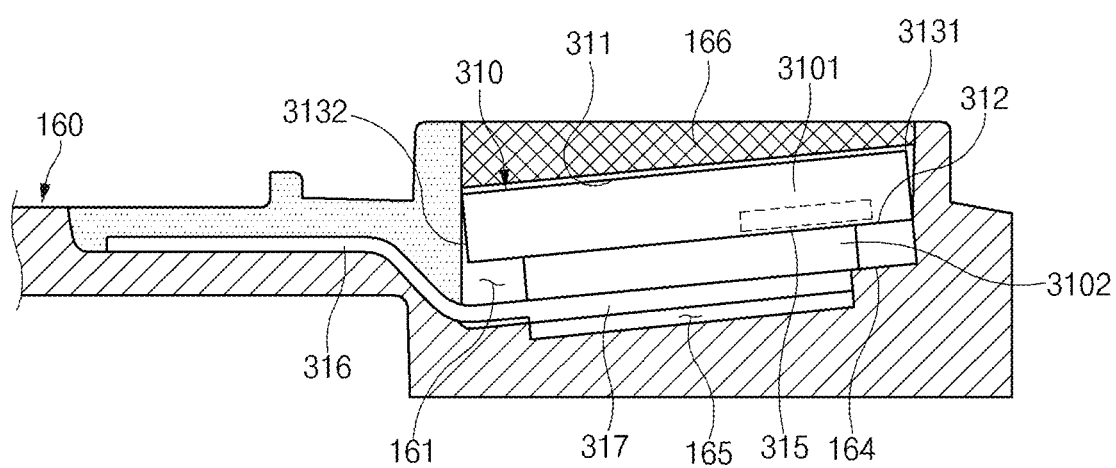
FIG. 12C illustrates a cross-sectional view of a rear case where a first antenna module is disposed, according to an embodiment.

FIGS. 12A, 12B, and 12C are views illustrating the first antenna module 310 of the electronic device 100 and the rear case 160 where the first antenna module 310 is disposed, according to an embodiment.

Referring to FIG. 12A, a protrusion 162 for fixing the first antenna module 310 may be formed at the recess 161 formed at the rear case 160.

The protrusion 162 may be formed to protrude from an inner surface of the recess 161 toward the inside of the recess 161. The protrusion 162 may press the first surface 311 of the first antenna module 310, thus preventing the first antenna module 310 from being detached toward the second cover 180.

Referring to FIG. 12B, a surface, which faces the second surface 312 of the first antenna module 310, of an inner surface of the recess 161 may be implemented with an inclined surface 164 having an angle corresponding to a placement angle of the first antenna module 310. An additional recess 165 into which the RFIC module 3102 disposed on the second surface 312 of the first antenna module 310 is able to be inserted may be formed at the inclined surface 164.

In various embodiments, the second surface 312 of the first antenna module 310 may be supported by the inclined surface 164 of the recess 161, and the first antenna module 310 may be pressed and fitted in the recess 161 by the protrusion 162 formed on the inner surface of the recess 161.

Referring to FIG. 12C, in various embodiments, the electronic device 100 may include a cover member 166 covering the first antenna module 310 for the purpose of fixing the first antenna module 310 in the recess 161 of the rear case 160. The cover member 166 may be formed of a nonmetal material and may not have an influence on the first RF signal radiated from the first surface 311. The cover member 166 may be fixed in the recess 161 by the second cover 180 or may have a separate component for fixing.

The first antenna module 310 may include an antenna substrate 3101 including the first surface 311 and the second surface 312, the RFIC module 3102 disposed on the second surface 312 of the antenna substrate 3101, a connector 317 formed on the second surface 312 of the antenna substrate 3101, and a flexible printed circuit board (FPCB) 316 connected with the connector 317. In the embodiment illustrated, the RFIC module 3102 may be disposed on the inclined surface 164. The connector 317 formed at the antenna substrate 3101 may further protrude toward the inclined surface 164 compared with the RFIC module 3102. Accordingly, the additional recess 165 for accommodating a portion of the connector 317 and the FPCB 316 may be formed in the recess 161 where the first antenna module 310 is accommodated. The additional recess 165 may be formed at the inclined surface 164.

Figure 13A:
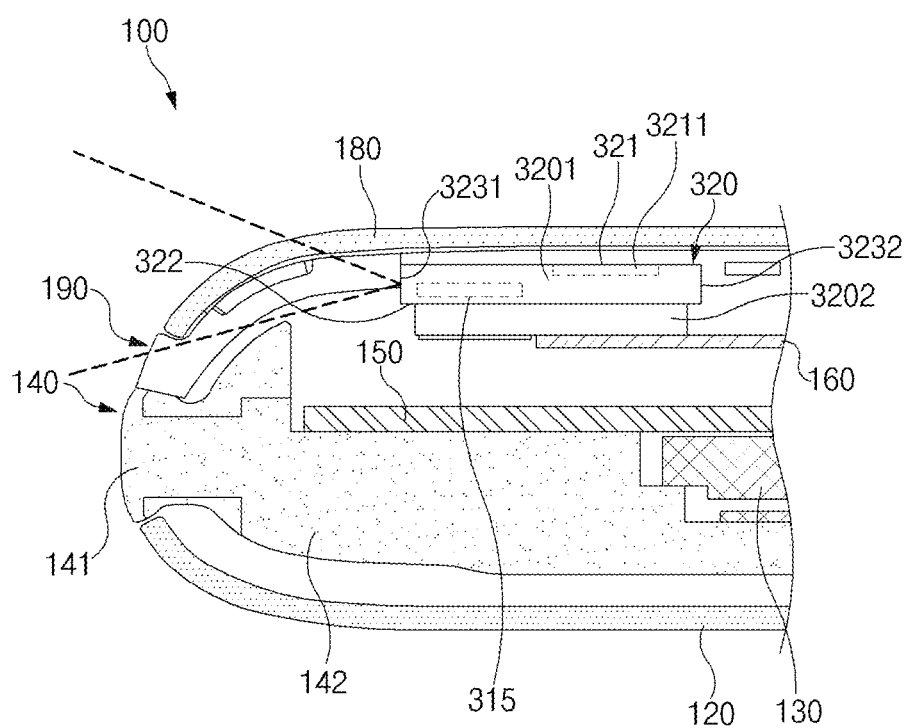
FIG. 13A illustrates a cross-sectional view of an electronic device where a second antenna module is disposed, according to an embodiment.
Figure 13B:
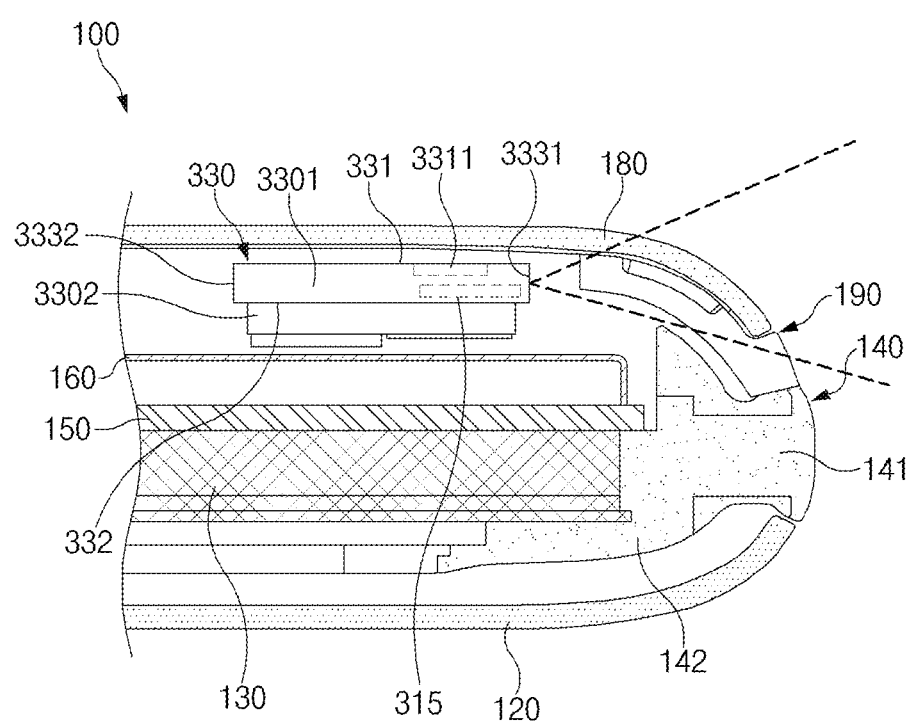
FIG. 13B illustrates a cross-sectional view of an electronic device where a third antenna module is disposed, according to an embodiment.

FIG. 13A illustrates a cross-sectional view of the electronic device 100 where the second antenna module 320 is disposed, according to an embodiment. FIG. 13B illustrates a cross-sectional view of the electronic device 100 where the third antenna module 330 is disposed, according to an embodiment.

Referring to FIG. 13A, the second antenna module 320 may be disposed on opposite sides (e.g., opposite ends of the x-axis direction of FIG. 8B) of the rear case 160.

The electronic device 100 according to the embodiment illustrated may include the first cover 120, the second cover 180 that is opposite to the first cover 120, the first side member 140 that is connected with the first cover 120 and includes the edge portion 141 forming a portion of an outer surface (e.g., a side surface) of the electronic device 100 and the plate portion 142 extended from the edge portion 141 between the first cover 120 and the second cover 180, and the second side member 190 that connects the second cover 180 and the first side member 140 and forms a portion of the rest of the outer surface (e.g., a side surface) of the electronic device 100.

In various embodiments, the electronic device 100 may further include the printed circuit board 150 that is interposed between the plate portion 142 of the first side member 140 and the second cover 180, the rear case 160 that is interposed between the printed circuit board 150 and the second cover 180, and the display 130 that is disposed in a direction facing away from the printed circuit board 150 with respect to the plate portion 142 (e.g., is disposed on a surface of the rear case 160, which faces the first cover 120).

In an embodiment, the electronic device 100 may include a housing (e.g., the housing 110 of FIG. 1) that includes the first cover 120, the second cover 180, and the first side member 140 surrounding a space between the first cover 120 and the second cover 180; and the display 130, the printed circuit board 150, and the rear case 160 may be arranged in the housing in order in a direction that faces the second cover 180 from the first cover 120.

According to the embodiment illustrated, the second antenna module 320 may be disposed at the rear case 160. The second antenna module 320 may include an antenna substrate 3201 that includes a first surface 321 (e.g., the first surface 211 of FIG. 9B), a second surface 322 on which an RFIC module 3202 (e.g., the RFIC module 2002 of FIG. 9A) is disposed and which is opposite to the first surface 321, and third surfaces 3231 and 3232 (e.g., the surfaces 2131 and 2132 of FIG. 9B) between the first surface 321 and the second surface 322, and the RFIC module 3202 disposed on the second surface 322.

In this case, a first radiation region 3211 (e.g., the first radiation region 2111 of FIG. 9B) where the first RF signal is radiated may be formed on the first surface 321 of the antenna substrate 3201, and a second radiation region (e.g., the (3-1)-th surface 2131 of FIG. 9B) where the second RF signal is radiated may be formed on at least a part (e.g., a (3-1)-th surface 3231) of the third surfaces 3231 and 3232.

In an embodiment, the second antenna module 320 may be disposed at the rear case 160 such that the first radiation region 3211 faces the second cover 180 and such that the (3-1)-th surface 3231 faces the second side member 190. In an embodiment, unlike a first antenna module (e.g., the first antenna module 310 of FIG. 11), the second antenna module 320 may be disposed parallel to the second cover 180 (e.g., the second cover 180 of FIG. 11).

Referring to FIG. 13B, the third antenna module 330 may be disposed on opposite sides (e.g., opposite ends of the x-axis direction of FIG. 8B) of the rear case 160.

According to the embodiment illustrated, the third antenna module 330 may be disposed at the rear case 160. The third antenna module 330 may include an antenna substrate 3301 that includes a first surface 331 (e.g., the first surface 211 of FIG. 9B), a second surface 332 that is opposite to the first surface 331, and third surfaces 3331 and 3332 (e.g., the surfaces 2131 and 2132 of FIG. 9B) between the first surface 331 and the second surface 332, and an RFIC module 3302 (e.g., the RFIC module 2002 of FIG. 9A) disposed on the second surface 332.

In this case, a first radiation region 3311 (e.g., the first radiation region 2111 of FIG. 9B) where the first RF signal is radiated may be formed on the first surface 331 of the antenna substrate 3301, and a second radiation region (e.g., the (3-1)-th surface 2131 of FIG. 9B) where the second RF signal is radiated may be formed on at least a part (e.g., a (3-1)-th surface 3331) of the third surfaces 3331 and 3332.

In an embodiment, the third antenna module 330 may be disposed at the rear case 160 such that the first radiation region 3311 faces the second cover 180 and such that the (3-1)-th surface 3331 where the second radiation region is formed faces the second side member 190. In an embodiment, unlike a first antenna module (e.g., the first antenna module 310 of FIG. 11), the third antenna module 330 may be disposed parallel to the second cover 180 (e.g., the second cover 180 of FIG. 11).

In various embodiments, the second antenna module 320 illustrated in FIG. 13A and the third antenna module 330 illustrated in FIG. 13B are illustrated as being disposed parallel to the second cover 180, but the disclosure is not limited thereto. For example, the second antenna module 320 and/or the third antenna module 330 may be disposed to be inclined so as to make a given angle with the second cover 180. Here, the given angle may be smaller than an angle that is formed by a first antenna module (e.g., the first antenna module 310 of FIG. 11) and the second cover 180.

Referring to FIGS. 11, 13A, and 13B, placement angles of a first antenna module (e.g., the first antenna module 310 of FIG. 11), a second antenna module (e.g., the second antenna module 320 of FIG. 13A), and a third antenna module (e.g., the third antenna module 330 of FIG. 13B) described in the disclosure may vary depending on a material of structures forming the exterior of the electronic device 100 or a housing. For example, the placement angle may be determined depending on a material of housing structures included in a range where an RF signal (e.g., a signal radiated from a dipole antenna) is radiated.

For example, in the case where side members (e.g., the first side member 140 and the second side member 190) forming a side surface of the electronic device 100 or a housing are formed of only a material (e.g., a ceramic or polymer) having no influence on radiation of radio waves, the first surfaces 311, 321, and 331 of the antenna substrates 3101, 3201, and 330 respectively included in the first, second, and third antenna modules 310, 320, and 330 may be disposed parallel to the second cover 180. That is, second radiation regions (e.g., the (3-1)-th surfaces 3131, 3231, and 3331) where the second RF signals are radiated may be disposed to face the side members (e.g., the first side member 140 and the second side member 190).

For example, in the case where a part of side members (e.g., the first side member 140 and the second side member 190) forming the side surface of the electronic device 100 or the housing is formed of a material (e.g., a metal) having an influence on radiation of radio waves and the rest thereof includes a material (e.g., a ceramic or polymer) having no influence on the radiation of radio waves (e.g., the first side member 140 is formed of a metal and the second side member 190 is formed of polycarbonate), the first, second, and third antenna modules 310, 320, and 330 may be disposed such that the first surfaces 311, 321, and 331 of the antenna substrates 3101, 3201, and 330 respectively included therein make a given angle with the second cover 180. That is, the second radiation regions (e.g., the (3-1)-th surfaces 3131, 3231, and 3331) where the second RF signals are radiated may be disposed to face a part, which includes a material having no influence on the radiation of radio waves, from among the side members 140 and 190 (e.g., to face the second side member 190 formed of polycarbonate).

The antenna modules 310, 320, and 330 may be disposed such that a metal material or a structure (e.g., the first side member 140) formed of a metal material is not included in the radiation range of the second RF signal.

In various embodiments, the electronic device 100 may include a housing that includes the front plate 120 facing a first direction, the back plate 180 facing a second direction opposite to the first direction, and a side member (e.g., including the first support member 140 and the second side member 190) surrounding a space between the front plate 120 and the back plate 180 and at least a portion of which is formed of a metal material, the display 130 that is viewable through the front plate 120, and an antenna module (e.g., the first antenna module 310 of FIG. 11) that is positioned in the space and includes the first surface 311 facing a third direction different from the first direction and the second direction, the second surface 312 facing a fourth direction different from the third direction, and at least one conductive element (e.g., the second antenna element 315 of FIG. 12A) extended in a fifth direction facing a first portion (e.g., the second side member 190 of FIG. 11) of the side member (140, 190). The at least one conductive element may be adjacent to the side member (140, 190) and may be between the first surface 311 and the second surface 312, and the fifth direction may be perpendicular to the third direction and the fourth direction. The first surface may include a first periphery (e.g., a portion where D2 of FIG. 12 is illustrated) the closest from the first portion of the side member, and a second periphery (e.g., a portion where D1 of FIG. 12 is illustrated) the most distant from the first portion 190 of the side member (140, 190), and the first surface 311 may make an angle between 1 degree to 15 degrees with the back plate 180 such that the first periphery is closer to the back plate 180 than the second periphery.

In various embodiments, the electronic device 100 may further include a wireless communication circuit (e.g., the RFIC module 3102 of FIG. 11) that transmits and/or receives a signal having a frequency between 20 GHz and 100 GHz, and the conductive element (e.g., the second antenna element 315 of FIG. 12A) may be electrically connected with the wireless communication circuit 3102.

In various embodiments, the conductive element 315 may form a dipole antenna.

In various embodiments, the back plate 180 may further include an edge portion that is adjacent to the first portion 190 of the side member (140, 190) and forms a bent surface.

In various embodiments, the first portion 190 of the side member (140, 190) may include a non-conductive material.

In various embodiments, the electronic device 100 may further include a mid plate (e.g., the rear case 160 of FIG. 11 or the first support member 142 of FIG. 3) interposed between the display 130 and the back plate 180, the antenna module 310 may be interposed between the mid plate 160 and the back plate 180.

In various embodiments, the mid plate 160 may include a first surface facing the first direction and the display 130, and a second surface opposite to the first surface and on which the antenna module 310 is disposed, a recess 161 where the antenna modules 310 is disposed is formed in the second surface of the mid plate 160, and the recess 161 may include an inclined surface 164 on which the second surface 312 of the antenna module 310 is disposed and having an angle corresponding to an angle formed by the back plate 180 and the first surface 311 of the antenna module 310.

In various embodiments, the side member (140, 190) may form a side surface of the electronic device 100 between the front plate 120 and the back plate 180 and may include a short side portion (e.g., the short side portion 140a of FIG. 10) having a first length and a long side portion (e.g., a long side portion 140b of FIG. 10) having a second length longer than the first length, the short side portion 140a may be formed from the front plate 120 to the back plate 180 with a first height, and the long side portion 140b may be formed from the front plate 120 to the back plate 180 with a second height greater than the first height.

In various embodiments, the antenna module (e.g., including the first antenna module 310, the second antenna module 320, and the third antenna module 330) may include a first antenna module (e.g., the first antenna module 310) disposed adjacent to the short side portion 140a and a second antenna module (e.g., the second antenna module 320 and the third antenna module 330) disposed adjacent to the long side portion 140b, and an angle formed by the first surface 311 of the first antenna module 310 and the back plate 180 may be greater than an angle formed by the first surface (321, 331) of the second antenna module (320, 330) and the back plate 180.

In various embodiments, the electronic device 100 may include a housing that includes the front plate 120 facing a first direction, the back plate 180 including a flat portion facing a second direction opposite to the first direction and a curved portion surrounding the flat portion, and a side member (e.g., including the first support member 140 and the second support member 190 of FIG. 11) surrounding a space between the front plate 120 and the back plate 180 and at least a portion of which is formed of a metal material, the display 130 that is viewable through the front plate 120, and the antenna module 310 that is positioned in the space and includes the first surface 311 facing a third direction different from the first direction and the second direction, the second surface 312 facing a fourth direction different from the third direction, and at least one or more conductive elements (e.g., the second antenna module 315 of FIG. 12A) extended in a fifth direction facing a first portion (e.g., the second side member 190) of the side member (140, 190). The at least one or more conductive elements (e.g., the second antenna module 315 of FIG. 12A) may be adjacent to the side member (140, 190) and may be between the first surface 311 and the second surface 312, and the fifth direction may be perpendicular to the third direction and the fourth direction. The first surface 311 may include a first periphery being closest from the first portion 190 of the side member (140, 190), and a second periphery being most distant from the first portion 190 of the side member (140, 190), and the first periphery may be disposed to be closer to the back plate 180 than the second periphery.

In various embodiments, the side member (140, 190) may include the short side portion 140a having a first length and the long side portion 140b having a second length longer than the first length and may form a side surface of the electronic device 100 between the front plate 120 and the back plate 180, and the side member (140, 190) may include a metal portion (e.g., the first support member 140 of FIG. 11) formed of a metal material and a nonmetal portion (e.g., the second side member 190 of FIG. 11) formed of a nonmetal material. When viewed from above the front plate 120 of the electronic device 100, the nonmetal portion 190 included in the short side portion 140a may be viewed to be wider than the nonmetal portion 190 included in the long side portion 140b.

In various embodiments, the side member (140, 190) may include the short side portion 140a having a first length and the long side portion 140b having a second length longer than the first length, the first portion 190 may be connected with the curved portion of the back plate 180, and the curved portion connected with the first portion 190 included in the short side portion 140a may have a curvature smaller than the curved portion connected with the first portion 190 included in the long side portion 140b.

In various embodiments, an electronic device may include a housing structure that includes a first cover (e.g., the front plate 120) forming a first surface of the electronic device, a second cover (e.g., the back plate 180) forming a second surface of the electronic device, which is opposite to the first surface, and a side member (140, 190) surrounding a space between the first cover (e.g., the front plate 120) and the second cover (e.g., the back plate 180) and forming a third surface of the electronic device, the display 130 that is interposed between the first cover (e.g., the front plate 120) and the second cover (e.g., the back plate 180), and the antenna module 310 that is interposed between the display 130 and the second cover (e.g., the back plate 180) and includes the first surface 311 including the first radiation region 3111 where a first RF signal is radiated, the second surface 312 opposite to the first surface 311, the third surface 3131 formed between the first surface 311 and the second surface 312 and including a second radiation region where a second RF signal is radiated, and the fourth surface 3132 formed between the first surface 311 and the second surface 312 and opposite to the third surface 3131. The antenna module 310 may be disposed to be inclined at a given angle with respect to the second cover (e.g., the back plate 180) such that the first surface 311 faces the second cover (e.g., the back plate 180), the third surface 3131 is more adjacent to the side member (140, 190) than the fourth surface 3132, and at least a portion of the second radiation region faces the second cover (e.g., the back plate 180).

In various embodiments, the side member (140, 190) may include a first portion (e.g., the first side member 140) and a second portion (e.g., the second side member 190), and the first portion may include a metal material and the second portion may include a non-conductive material.

In various embodiments, at least a portion of the third surface 3131 of the antenna module 310 may face the second portion (e.g., the second side member 190).

In various embodiments, the antenna module 310 may be disposed to be inclined, such that a radiation range of the second RF signal further includes the second portion (e.g., the second side member 190) of the side member (140, 190) compared with the first portion (e.g., the first side member 140) of the side member (140, 190).

In various embodiments, the first surface 311 of the antenna module 310 may include a first region adjacent to the third surface 3131 of the antenna module 310 and a second region adjacent to the fourth surface 3132 of the antenna module 310, and a first distance between the first region and the second cover (e.g., the back plate 180) may be smaller than a second distance between the second region and the second cover (e.g., the back plate 180).

In various embodiments, a radio frequency integrated circuit (RFIC) module may be disposed on the second surface 312 of the antenna module 310.

In various embodiments, the first surface 311 of the antenna module 310 may be perpendicular to the third surface 3131 of the antenna module 310.

In various embodiments, the side member (140, 190) may include a first structure (e.g., the edge portion 141) forming a side surface of the electronic device and a second structure (e.g., the plate portion 142) extended into an inside of the housing structure from the first structure, the electronic device may further include the rear case 160 that is interposed between the second structure and the second cover, and the antenna module 310 may be disposed at the rear case 160.

In various embodiments, the recess 161 into which the antenna module 310 is inserted may be formed at the rear case 160, the recess 161 may include an inclined surface 164 on which the second surface 312 of the antenna module 310 is disposed, and the protrusion 162 that protrudes from an inner surface of the recess 161 so as to press a portion of an edge of the first surface 311 of the antenna module 310.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 440) including one or more instructions that are stored in a storage medium (e.g., internal memory 436 or external memory 438) that is readable by a machine (e.g., the electronic device 401). For example, a processor (e.g., the processor 420) of the machine (e.g., the electronic device 401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturers server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to embodiments of the disclosure, in an electronic device including a housing and an antenna module included in the housing, an antenna module layout structure capable of minimizing the influence of a metal component of the housing on an RF signal and an electronic device including the same may be provided.

Besides, a variety of effects directly or indirectly understood through this disclosure may be provided.

Although the present disclosure has been described with various embodiments, various changes and modifications may be suggested to one skilled in the art. It is intended that the present disclosure encompass such changes and modifications as fall within the scope of the appended claims.

What is claimed is:
1. An electronic device comprising:
a housing including a front plate facing a first direction, a back plate facing a second direction opposite to the first direction, and a side member surrounding a space between the front plate and the back plate and at least a portion of which is formed of a metal material;
a display viewable through the front plate; and
an antenna module including an antenna substrate positioned in the space, and wherein the antenna substrate includes:

a first surface facing a third direction different from the first direction and the second direction;
a second surface facing a fourth direction opposite to the third direction;
a plurality of layers including a first layer forming the first surface, a second layer forming the second surface, and at least one third layer disposed between the first layer and the second layer; and
at least one conductive element providing at least one of the plurality of layers and extended in a fifth direction facing a first portion of the side member, the at least one conductive element being adjacent to the side member, and the fifth direction being perpendicular to the third direction and the fourth direction, wherein the at least one conductive element is configured to radiate an RF signal,
wherein the first surface is disposed at an angle with respect to the back plate and includes:
a first periphery being closest from the first portion of the side member and being spaced from the back plate by a first distance; and
a second periphery being most distant from the first portion of the side member and being spaced from the back plate by a second distance that is greater than the first distance, and
wherein the first surface is inclined such that the first periphery is closer to the back plate than the second periphery and a radiation range of the RF signal passes through at least a portion of the back plate.

2. The electronic device of claim 1, further comprising:
a wireless communication circuit configured to transmit and/or receive a signal having a frequency between 20 GHz and 100 GHz,
wherein the conductive element is electrically connected with the wireless communication circuit.

3. The electronic device of claim 1, wherein the conductive element forms a dipole antenna.

4. The electronic device of claim 1, wherein the first surface makes an angle between 1 degree to 15 degrees with the back plate such that the first periphery is closer to the back plate than the second periphery.

5. The electronic device of claim 1, wherein the first portion of the side member includes a non-conductive material.

6. The electronic device of claim 1, further comprising:
a mid plate interposed between the display and the back plate,
wherein the antenna module is interposed between the mid plate and the back plate.

7. The electronic device of claim 6, wherein:
the mid plate includes a first surface facing the first direction and the display, and a second surface opposite to the first surface and on which the antenna module is disposed; and
a recess where the antenna module is disposed is formed in the second surface of the mid plate, and
wherein the recess includes:
an inclined surface on which the second surface of the antenna module is disposed and having an angle corresponding to an angle formed by the back plate and the first surface of the antenna module.

8. The electronic device of claim 1, wherein:
the side member forms a side surface of the electronic device between the front plate and the back plate and includes a short side portion having a first length and a long side portion having a second length longer than the first length;
the short side portion is formed from the front plate to the back plate with a first height; and
the long side portion is formed from the front plate to the back plate with a second height greater than the first height.

9. The electronic device of claim 8, wherein:
the antenna module includes a first antenna module disposed adjacent to the short side portion and a second antenna module disposed adjacent to the long side portion; and
an angle formed by the first surface of the first antenna module and the back plate is greater than an angle formed by the first surface of the second antenna module and the back plate.

10. An electronic device comprising:
a housing including a front plate facing a first direction, a back plate including a flat portion facing a second direction opposite to the first direction and a curved portion surrounding the flat portion, and a side member surrounding a space between the front plate and the back plate and at least a portion of which is formed of a metal material;
a display viewable through the front plate; and
an antenna substrate positioned in the space, and wherein the antenna substrate includes:
a first surface disposed at an angle with respect to the flat portion of the back plate and facing the back plate, wherein an air gap is provided between the first surface and the back plate;
a second surface facing a direction opposite to the first surface;
a third surface facing a direction perpendicular to the first surface and facing a portion of the side member and a portion of the curved portion of the back plate;
a fourth surface facing a direction opposite to the third surface;
a first antenna element configured to radiate a first RF signal from a first radiation region included in the first surface, and wherein the first RF signal passes through the air gap and at least a portion of the flat portion of the back plate; and
a second antenna element configured to radiate a second RF signal from a second radiation region included in the third surface, and wherein the second RF signal passes through at least a portion of the curved portion of the back plate,
wherein the first surface and the third surface form a first periphery, and the first surface and the fourth surface form a second periphery, and
wherein the first surface is inclined such that the first periphery is closer to the back plate than the second periphery.

11. The electronic device of claim 10, wherein:
the side member includes a short side portion having a first length and a long side portion having a second length longer than the first length and forms a side surface of the electronic device between the front plate and the back plate;
the side member includes a metal portion formed of a metal material and a nonmetal portion formed of a nonmetal material; and
when viewed from above the front plate of the electronic device, the nonmetal portion included in the short side portion is viewed to be wider than the nonmetal portion included in the long side portion.

12. The electronic device of claim 10, wherein:
the side member includes a short side portion having a first length and a long side portion having a second length longer than the first length;
the side member includes a metal portion formed of a metal material and a nonmetal portion formed of a nonmetal material;
the nonmetal portion is connected with the curved portion of the back plate; and
the curved portion connected with the nonmetal portion included in the short side portion has a curvature smaller than the curved portion connected with the nonmetal portion included in the long side portion.

13. An electronic device comprising:
a housing structure including a first cover forming a first surface of the electronic device, a second cover forming a second surface of the electronic device, which is opposite to the first surface, and a side member surrounding a space between the first cover and the second cover and forming a third surface of the electronic device;
a display interposed between the first cover and the second cover; and
an antenna module interposed between the display and the second cover, and including a first surface including a first radiation region where a first radio frequency (RF) signal is radiated, a second surface opposite to the first surface, a third surface formed between the first surface and the second surface and including a second radiation region where a second RF signal is radiated, and a fourth surface formed between the first surface and the second surface and opposite to the third surface,
wherein the antenna module is disposed to be inclined at a given angle with respect to the second cover such that the first surface faces the second cover, the third surface is more adjacent to the side member than the fourth surface, and at least a portion of the second radiation region faces the second cover and wherein the given angle comprises an angle within a range of 1° to 15°.

14. The electronic device of claim 13, wherein:
the side member includes a first portion and a second portion;
the first portion includes a metal material and the second portion includes a non-conductive material; and
at least a portion of the third surface of the antenna module is disposed to face the second portion.

15. The electronic device of claim 14, wherein the antenna module is disposed to be inclined, such that a radiation range of the second RF signal further includes the second portion of the side member compared with the first portion of the side member.

16. The electronic device of claim 13, wherein:
the first surface of the antenna module includes a first region adjacent to the third surface of the antenna module and a second region adjacent to the fourth surface of the antenna module; and
a first distance between the first region and the second cover is smaller than a second distance between the second region and the second cover.

17. The electronic device of claim 13, wherein a radio frequency integrated circuit (RFIC) module is disposed on the second surface of the antenna module.

18. The electronic device of claim 13, wherein the first surface of the antenna module is perpendicular to the third surface of the antenna module.

19. The electronic device of claim 13, wherein the side member includes a first structure forming a side surface of the electronic device and a second structure extended into an inside of the housing structure from the first structure,
wherein the electronic device further comprises a rear case interposed between the second structure and the second cover, and
wherein the antenna module is disposed at the rear case.

20. The electronic device of claim 19, wherein a recess into which the antenna module is inserted is formed at the rear case, and
wherein the recess includes:
an inclined surface on which the second surface of the antenna module is disposed; and
a protrusion protruding from an inner surface of the recess so as to press a portion of an edge of the first surface of the antenna module.

* * * * *